(12) United States Patent
Kondo et al.

(10) Patent No.: US 11,354,201 B2
(45) Date of Patent: Jun. 7, 2022

(54) EFFECTIVE SELECTION OF A VIRTUAL MACHINE TO BE MOVED OUTSIDE INFLUENCE RANGE OF A FAILURE

(71) Applicant: FUJITSU LIMITED, Kawasaki (JP)

(72) Inventors: Reiko Kondo, Yamato (JP); Yukihiro Watanabe, Kawasaki (JP); Masahiro Asaoka, Kawasaki (JP); Tetsuya Uchiumi, Kawasaki (JP); Fumi Iikura, Shinagawa (JP); Kazuhiro Suzuki, Kawasaki (JP); Shingo Okuno, Kawasaki (JP); Yuji Saito, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 514 days.

(21) Appl. No.: 16/435,606

(22) Filed: Jun. 10, 2019

(65) Prior Publication Data

US 2019/0384682 A1 Dec. 19, 2019

(30) Foreign Application Priority Data

Jun. 14, 2018 (JP) .............................. JP2018-113809

(51) Int. Cl.
  *G06F 11/14* (2006.01)
  *G06F 9/455* (2018.01)

(52) U.S. Cl.
  CPC ...... *G06F 11/1471* (2013.01); *G06F 9/45558* (2013.01); *G06F 2009/45562* (2013.01); *G06F 2201/815* (2013.01)

(58) Field of Classification Search
  CPC .............. G06F 11/1471; G06F 9/45558; G06F 2009/45562; G06F 2201/815;
  (Continued)

(56) References Cited

U.S. PATENT DOCUMENTS

2013/0246666 A1* 9/2013 Vemuri ................. G06F 3/0622
                                                             710/15

FOREIGN PATENT DOCUMENTS

JP    11-259331    9/1999

OTHER PUBLICATIONS

Wikipedia "fencing" page from date Mar. 4, 2017, retrieved from https://web.archive.org/web/20170304163514/https://en.wikipedia.org/wiki/Fencing_(computing) (Year: 2017).*

(Continued)

*Primary Examiner* — Yair Leibovich
(74) *Attorney, Agent, or Firm* — Fujitsu Patent Center

(57) ABSTRACT

A method performed by an apparatus is provided. The apparatus extracts a virtual machine before starting operation from among virtual machines within a range of influence of a failure upon detection of the failure. With reference to a storage unit storing history information concerning operation of a virtual machine, the apparatus generates first information corresponding to time intervals of operation start time of the extracted virtual machine, second information corresponding to movement required time required to move the extracted virtual machine out of the range of influence of the failure, and third information corresponding to recovery required time required for recovery of the failure detected to have occurred. The apparatus determines whether to move the extracted virtual machine out of the range of influence of the failure, based on the generated first, second, and third information.

15 Claims, 27 Drawing Sheets

(58) Field of Classification Search
CPC .. G06F 11/004; G06F 11/1484; G06F 11/142; G06F 2009/4557; G06F 2009/45575; G06F 2009/45591
USPC ........................................................ 714/19
See application file for complete search history.

(56) References Cited

OTHER PUBLICATIONS

Wikipedia "computer fencing" page, retrieved from https://en.wikipedia.org/wiki/Fencing_(computing) (Year: 2022).*

* cited by examiner

FIG. 14
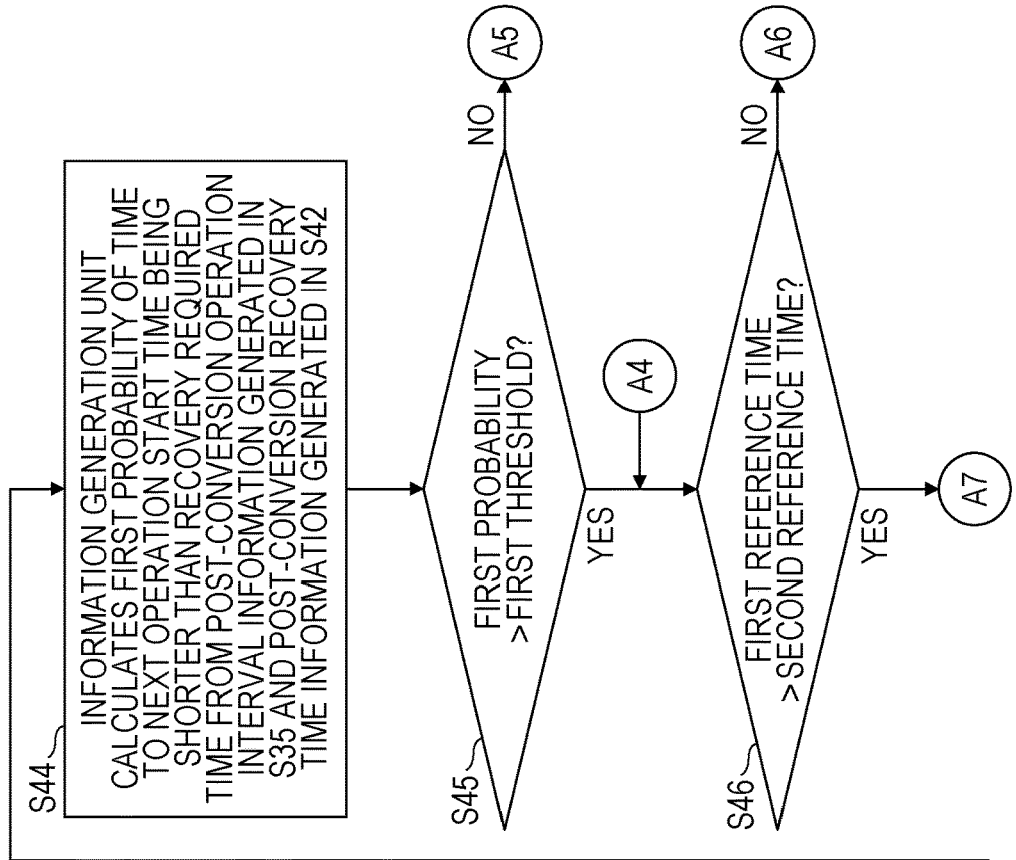
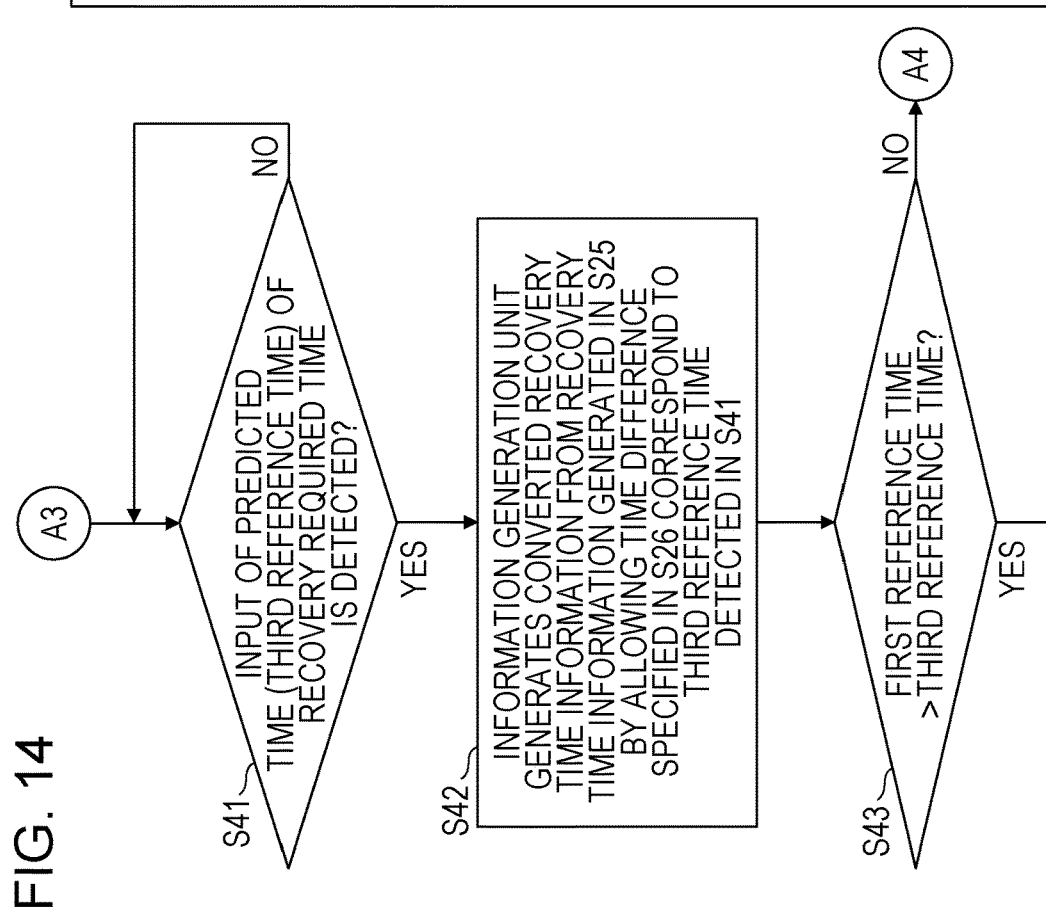

FIG. 16
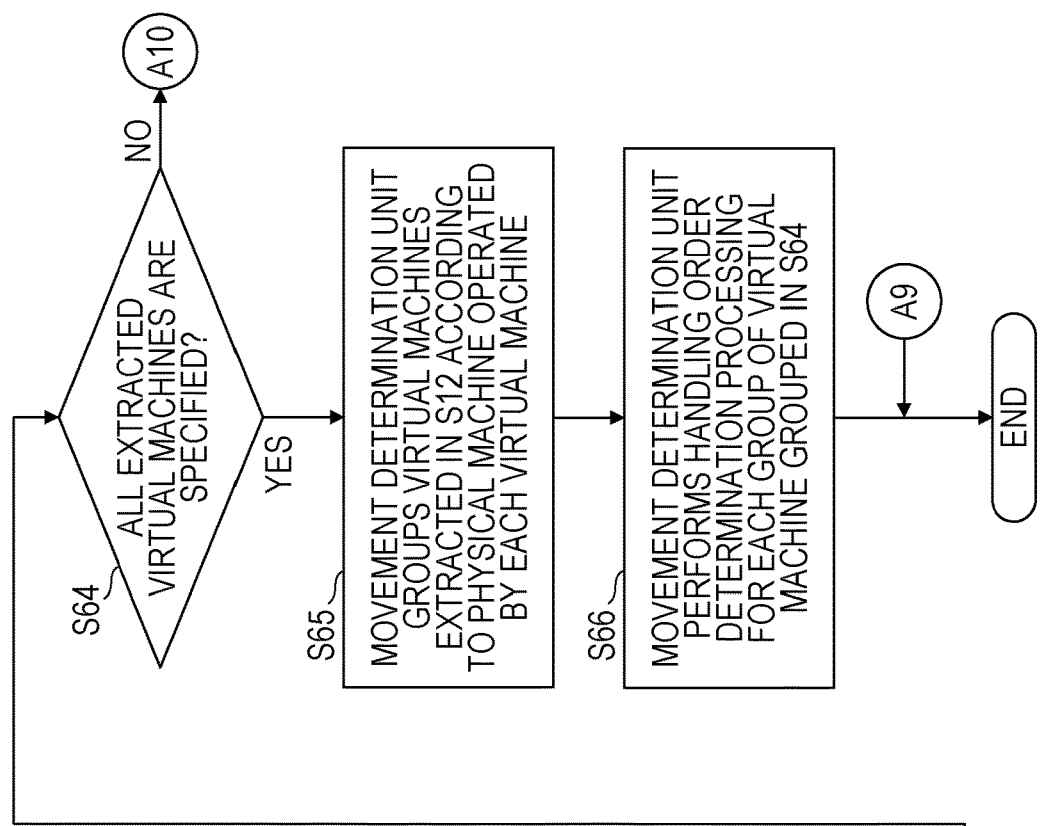
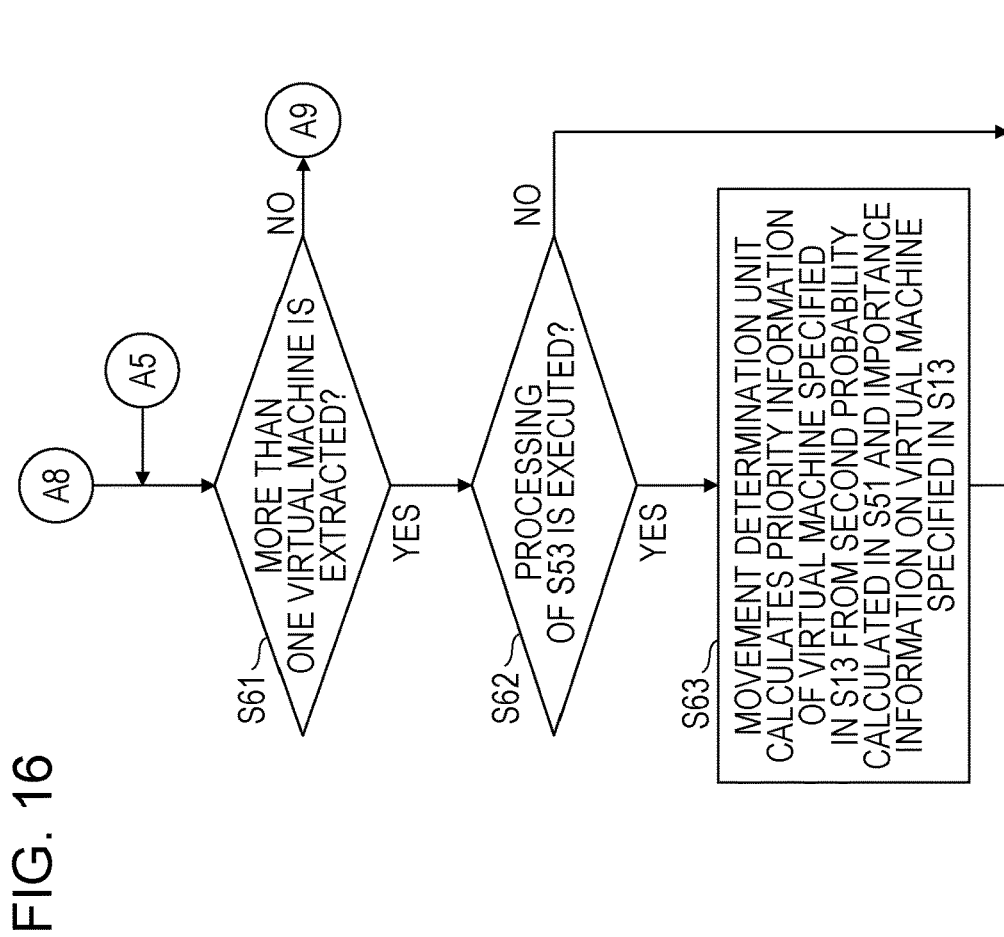

FIG. 17
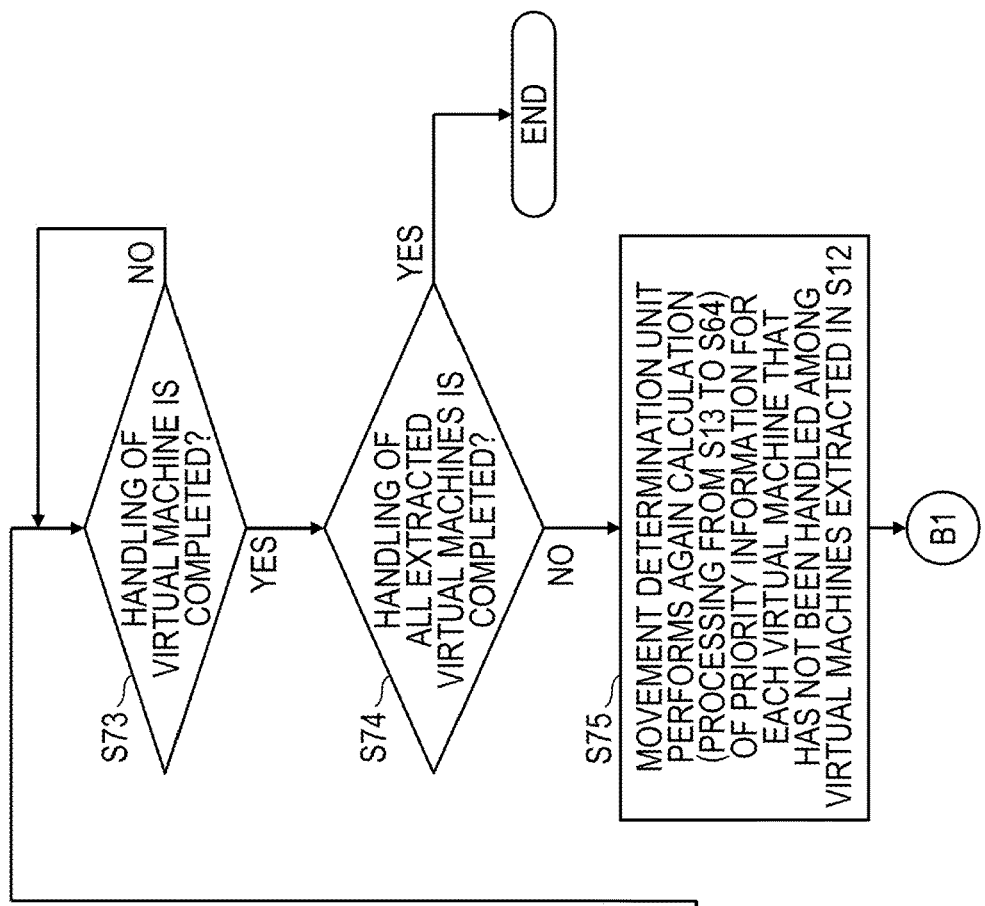
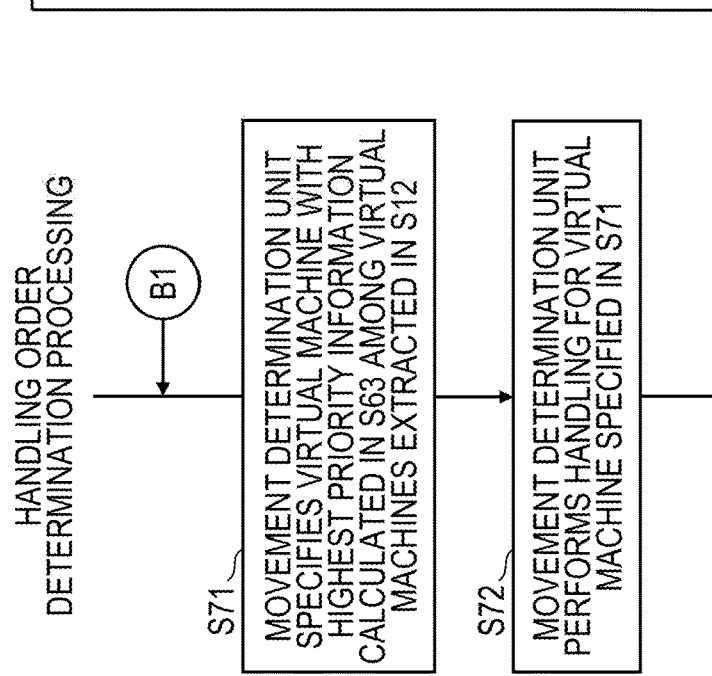

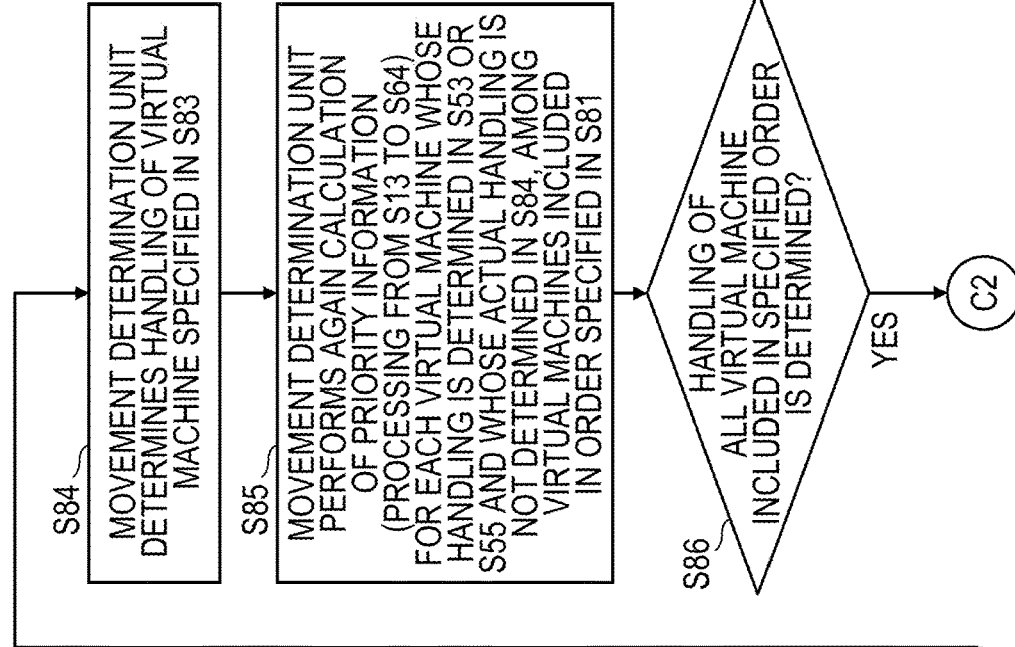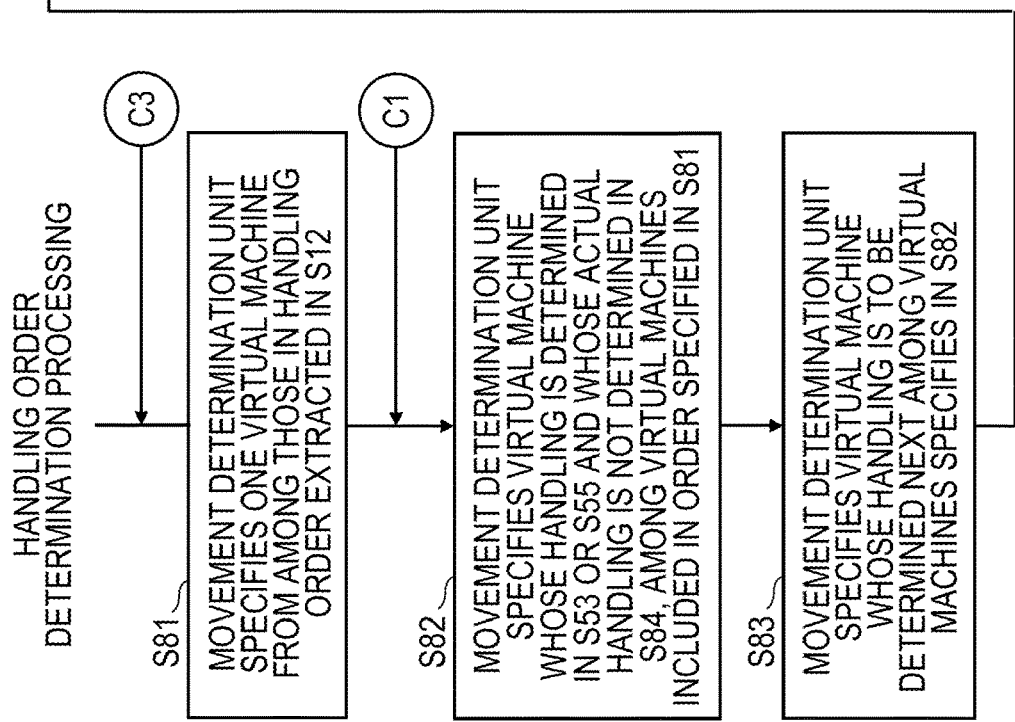
FIG. 18

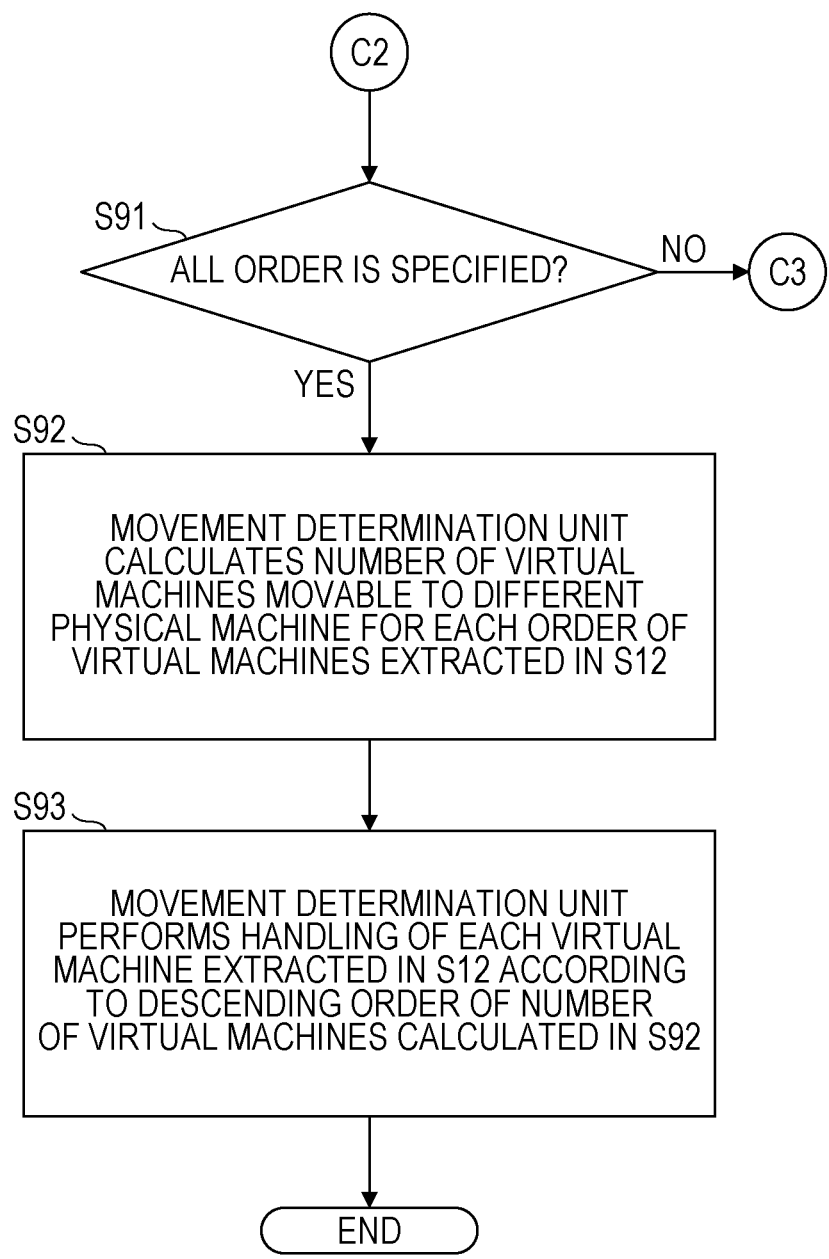

FIG. 20A ~ 131a

| ITEM NUMBER | OPERATION START TIME | TIME INTERVAL |
|---|---|---|
| 1 | 12:05 | — |
| 2 | 15:00 | 2:55 |
| 3 | 18:10 | 3:10 |
| 4 | 20:55 | 2:45 |
| ... | ... | ... |

FIG. 20B ~ 131b

| ITEM NUMBER | MOVEMENT REQUIRED TIME |
|---|---|
| 1 | 2:10 |
| 2 | 1:40 |
| 3 | 1:00 |
| 4 | 3:30 |
| ... | ... |

FIG. 20C ~ 131c

| ITEM NUMBER | RECOVERY REQUIRED TIME | PREDICTED TIME | TIME DIFFERENCE |
|---|---|---|---|
| 1 | 4:30 | 4:00 | +0:30 |
| 2 | 1:15 | 2:00 | -0:45 |
| 3 | 3:45 | 3:30 | +0:15 |
| 4 | 4:15 | 4:30 | -0:15 |
| ... | ... | ... | ... |

FIG. 20D ~ 131d

| ITEM NUMBER | ADDITION REQUIRED TIME |
|---|---|
| 1 | 0:10 |
| 2 | 0:10 |
| 3 | 0:15 |
| 4 | 0:10 |
| ... | ... |

FIG. 21A ~132

| ITEM NUMBER | TIME INTERVAL ZONE | PERCENTAGE (%) |
|---|---|---|
| 1 | 2:45 TO 3:00 | 10 |
| 2 | 3:00 TO 3:15 | 15 |
| 3 | 3:15 TO 3:30 | 30 |
| 4 | 3:30 TO 3:45 | 20 |
| ... | ... | ... |

FIG. 21B ~133

| ITEM NUMBER | MOVEMENT REQUIRED TIME ZONE | PERCENTAGE (%) |
|---|---|---|
| 1 | 0:30 TO 1:00 | 6 |
| 2 | 1:00 TO 1:30 | 11 |
| 3 | 1:30 TO 2:00 | 32 |
| 4 | 2:00 TO 2:30 | 40 |
| ... | ... | ... |

FIG. 21C ~134

| ITEM NUMBER | TIME DIFFERENCE ZONE | PERCENTAGE (%) |
|---|---|---|
| 1 | −0:45 TO −0:30 | 5 |
| 2 | −0:30 TO −0:15 | 12 |
| 3 | −0:15 TO −0:00 | 16 |
| 4 | 0:00 TO 0:15 | 33 |
| ... | ... | ... |

FIG. 21D ~135

| ITEM NUMBER | ADDITION REQUIRED TIME ZONE | PERCENTAGE (%) |
|---|---|---|
| 1 | 0:00 TO 0:05 | 2 |
| 2 | 0:05 TO 0:10 | 15 |
| 3 | 0:10 TO 0:15 | 66 |
| 4 | 0:15 TO 0:20 | 14 |
| ... | ... | ... |

| ITEM NUMBER | OPERATION START REQUIRED TIME ZONE | PERCENTAGE (%) |
|---|---|---|
| 1 | 1:45 TO 2:00 | 10 |
| 2 | 2:00 TO 2:15 | 15 |
| 3 | 2:15 TO 2:30 | 30 |
| 4 | 2:30 TO 2:45 | 20 |
| ... | ... | ... |

132a

| ITEM NUMBER | RECOVERY REQUIRED TIME ZONE | PERCENTAGE (%) |
|---|---|---|
| 1 | 0:45 TO 1:00 | 5 |
| 2 | 1:00 TO 1:15 | 12 |
| 3 | 1:15 TO 1:30 | 16 |
| 4 | 1:30 TO 1:45 | 33 |
| ... | ... | ... |

| ITEM NUMBER | VIRTUAL MACHINE | HANDLING | SECOND PROBABILITY | IMPORTANCE | PRIORITY | PHYSICAL MACHINE |
|---|---|---|---|---|---|---|
| 1 | VM1 | MOVEMENT | 0.4 | 1 | 0.4 | A |
| 2 | VM2 | MOVEMENT | 0.2 | 3 | 0.6 | A |
| 3 | VM3 | PHYSICAL RESOURCE ADDED | – | 3 | – | A |
| 4 | VM4 | MOVEMENT | 0.1 | 1 | 0.1 | B |
| 5 | VM5 | PHYSICAL RESOURCE ADDED | – | 2 | – | B |
| 6 | VM6 | PHYSICAL RESOURCE ADDED | – | 3 | – | B |

FIG. 29

| ITEM NUMBER | VIRTUAL MACHINE | HANDLING | SECOND PROBABILITY | IMPORTANCE | PRIORITY | PHYSICAL MACHINE |
|---|---|---|---|---|---|---|
| 1 | VM1 | MOVEMENT | 0.4 | 1 | 0.4 | A |
| 3 | VM3 | MOVEMENT | 0.4 | 3 | 1.2 | A |
| 4 | VM4 | MOVEMENT | 0.1 | 1 | 0.1 | B |
| 5 | VM5 | PHYSICAL RESOURCE ADDED | – | 2 | – | B |
| 6 | VM6 | PHYSICAL RESOURCE ADDED | – | 3 | – | B |

EFFECTIVE SELECTION OF A VIRTUAL MACHINE TO BE MOVED OUTSIDE INFLUENCE RANGE OF A FAILURE

CROSS-REFERENCE TO RELATED APPLICATION

This application is based upon and claims the benefit of priority of the prior Japanese Patent Application No. 2018-113809, filed on Jun. 14, 2018, the entire contents of which are incorporated herein by reference.

FIELD

The embodiment discussed herein is related to effective selection of a virtual machine to be moved outside influence range of a failure.

BACKGROUND

For example, an operator providing services to a user (hereinafter simply referred to as the operator) builds and operates an information processing system for providing the services. For example, the operator uses a plurality of virtual machines operated in a physical machine, for example, to build the information processing system.

Upon occurrence of a failure likely to affect the services provided to the user, for example, the operator estimates the cause of the failure and the range of influence thereof. Thereafter, the operator takes measures corresponding to the estimated cause and range of influence of the failure (see, for example, Japanese Laid-open Patent Publication No. 11-259331).

SUMMARY

According to an aspect of the embodiments, a method performed by an apparatus is provided. The apparatus extracts a virtual machine before starting operation from among virtual machines within a range of influence of a failure upon detection of the failure. With reference to a storage unit storing history information concerning operation of a virtual machine, the apparatus generates first information corresponding to time intervals of operation start time of the extracted virtual machine, second information corresponding to movement required time required to move the extracted virtual machine out of the range of influence of the failure, and third information corresponding to recovery required time required for recovery of the failure detected to have occurred. The apparatus determines whether to move the extracted virtual machine out of the range of influence of the failure, based on the generated first, second, and third information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a flowchart explaining details of the failure handling processing according to an embodiment;

FIG. 16 is a flowchart explaining details of the failure handling processing according to an embodiment;

FIG. 17 is a flowchart explaining details of the failure handling processing according to an embodiment;

FIG. 18 is a flowchart explaining details of the failure handling processing according to an embodiment;

FIG. 19 is a flowchart explaining details of the failure handling processing according to an embodiment;

FIGS. 20A to 20D are diagrams explaining examples of history information;

FIGS. 21A to 21D are diagrams explaining examples of operation interval information, movement time information, recovery time information, and addition time information;

FIG. 28 is a diagram explaining an example of importance information and priority information; and FIG. 29 is a diagram explaining an example of the importance information and the priority information.

DESCRIPTION OF EMBODIMENTS

Measures, which are to be taken by the operator upon occurrence of a failure likely to affect the services provided to the user, includes moving the virtual machine to a safe physical machine outside the range of influence of the failure.

For example, when there is a virtual machine not subjected to any processing (hereinafter also referred to as the virtual machine not in operation) within the range of influence of the failure, the operator may estimate that the virtual machine is one that is not yet affected by the failure. Therefore, in this case, the operator may suppress the influence of the failure that has occurred by moving the virtual machine not in operation to the safe physical machine before the virtual machine starts its operation.

It is desirable to take into consideration the time when the virtual machine not in operation starts its operation (hereinafter also referred to as the operation start time), the time required to move the virtual machine not in operation (hereinafter also referred to as the movement required time), and the like to determine whether or not the virtual machine not in operation may be moved.

However, the operation start time and movement required time for the virtual machine vary according to the usage of the services by the user, or the like. Therefore, the operator may sometimes not easily determine the virtual machine to be moved in the event of failure.

It is preferable to enable the operator to determine a virtual machine to be moved in the event of failure.

[Configuration of Information Processing System]

Figure 1:
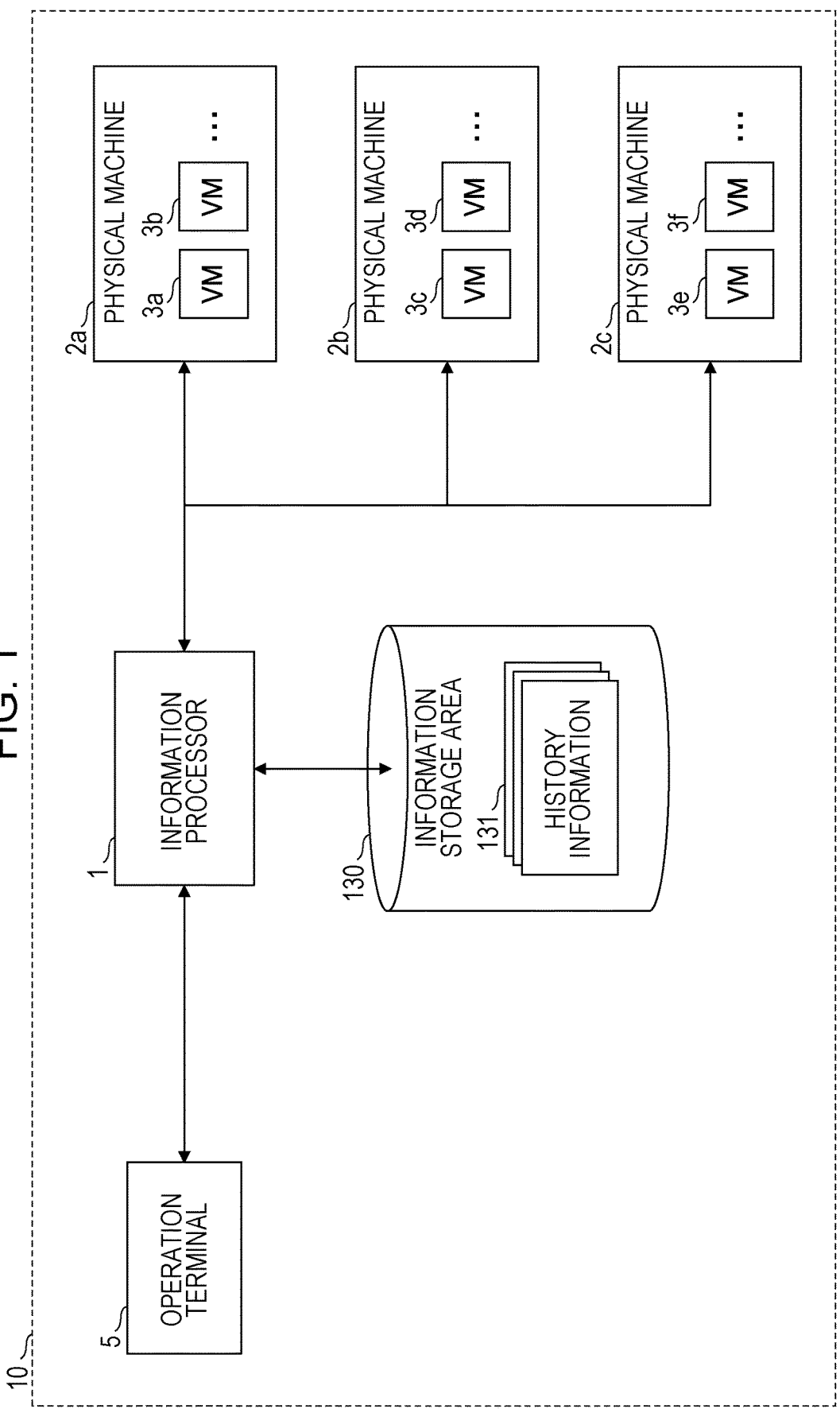
FIG. 1 is a diagram illustrating a configuration of an information processing system.

FIG. 1 is a diagram illustrating a configuration of an information processing system 10. The information processing system 10 illustrated in FIG. 1 includes an information processor 1, an information storage area 130, physical machines 2a, 2b, and 2c, and an operation terminal 5. The information storage area 130 is a storage area included in a storage device (not illustrated) located outside the information processor 1, or a storage area located inside the information processor 1.

Hereinafter, operation means that some kind of processing goes underway, for example, that processing load is increased with the start of processing such as batch processing.

The physical machine 2a is a physical machine in which a plurality of virtual machines including virtual machines 3a and 3b are operated. Likewise, the physical machine 2b is a physical machine in which a plurality of virtual machines including virtual machines 3c and 3d are operated, and the physical machine 2c is a physical machine in which a plurality of virtual machines including virtual machines 3e and 3f are operated. Hereinafter, the physical machines 2a to 2c are also collectively referred to as the physical machine 2 which means any one of the physical machines 2a to 2c. Likewise, hereinafter, the plurality of virtual machines including the virtual machines 3a to 3f are also collectively referred to as the virtual machine 3 which means any one of the virtual machines 3a to 3f.

The operation terminal 5 is, for example, a personal computer (PC) used by an operator. For example, the operation terminal 5 transmits information inputted by the operator to the information processor 1.

The information processor 1 regularly monitors, for example, operating conditions of each physical machine 2 or a network (not illustrated). Upon detection of occurrence of a failure that affects the operation of the virtual machine 3, the information processor 1 takes measures to move the virtual machine 3 currently not in operation (virtual machine 3 to be operated in the future), among the virtual machines 3 within the range of influence of the failure that has occurred, to the physical machine 2 outside the range of influence of the failure.

For example, the information processor 1 refers, in this case, to the information storage area 130 storing history information 131 including, for example, operation start time of each virtual machine 3 in the past, movement required time required for the virtual machine 3 to move in the past between the physical machines 2, and the like. The information processor 1 moves the virtual machine 3 movable to the physical machine 2 outside the range of influence of the failure (hereinafter also referred to as the different physical machine 2) before the next operation is started, among the virtual machines 3 within the range of influence of the failure that has occurred and currently not in operation.

However, the operation start time and the movement required time for the virtual machine 3 vary according to the usage of services by a user, and the like. Therefore, the operator may sometimes not easily determine the virtual machine 3 to be moved in the event of occurrence of a failure.

Upon detection of occurrence of a failure, the information processor 1 according to this embodiment extracts the virtual machine 3 before starting its operation from among the virtual machines 3 within the range of influence of the failure detected to have occurred. The information processor 1 refers to the information storage area 130 storing the history information 131 to generate information corresponding to time intervals of the operation start time of the extracted virtual machine 3 (hereinafter also referred to as the operation interval information or first information), information corresponding to the movement required time required to move the extracted virtual machine 3 to the different physical machine 2 (hereinafter also referred to as the movement time information or second information), and information corresponding to recovery required time required for recovery of the failure detected to have occurred (hereinafter also referred to as the recovery time information or third information).

The information processor 1 determines whether to move the extracted virtual machine 3 to the different physical machine 2, based on the generated operation interval information, movement time information, and recovery time information.

For example, the information processor 1 refers to the history information 131 that is the information about failures that have occurred in the past and the information about the operating conditions of the virtual machine 3 to predict the time when the extracted virtual machine 3 starts its next operation, the time required when the extracted virtual machine 3 is to be moved, and the time required for recovery of the failure detected to have occurred. The information processor 1 specifies the virtual machine 3 that may be successfully moved to the different physical machine 2 before the next operation is started, based on the various kinds of information predicted. The information processor 1 further determines the specified virtual machine 3 to be a virtual machine 3 to be moved to the different physical machine 2.

Thus, the information processor 1 may properly specify the virtual machine 3 required to be moved to the different physical machine 2 in the event of a failure. Therefore, the operator may further suppress the influence of the failure that has occurred.

[Hardware Configuration of Information Processing System]

Figure 2:
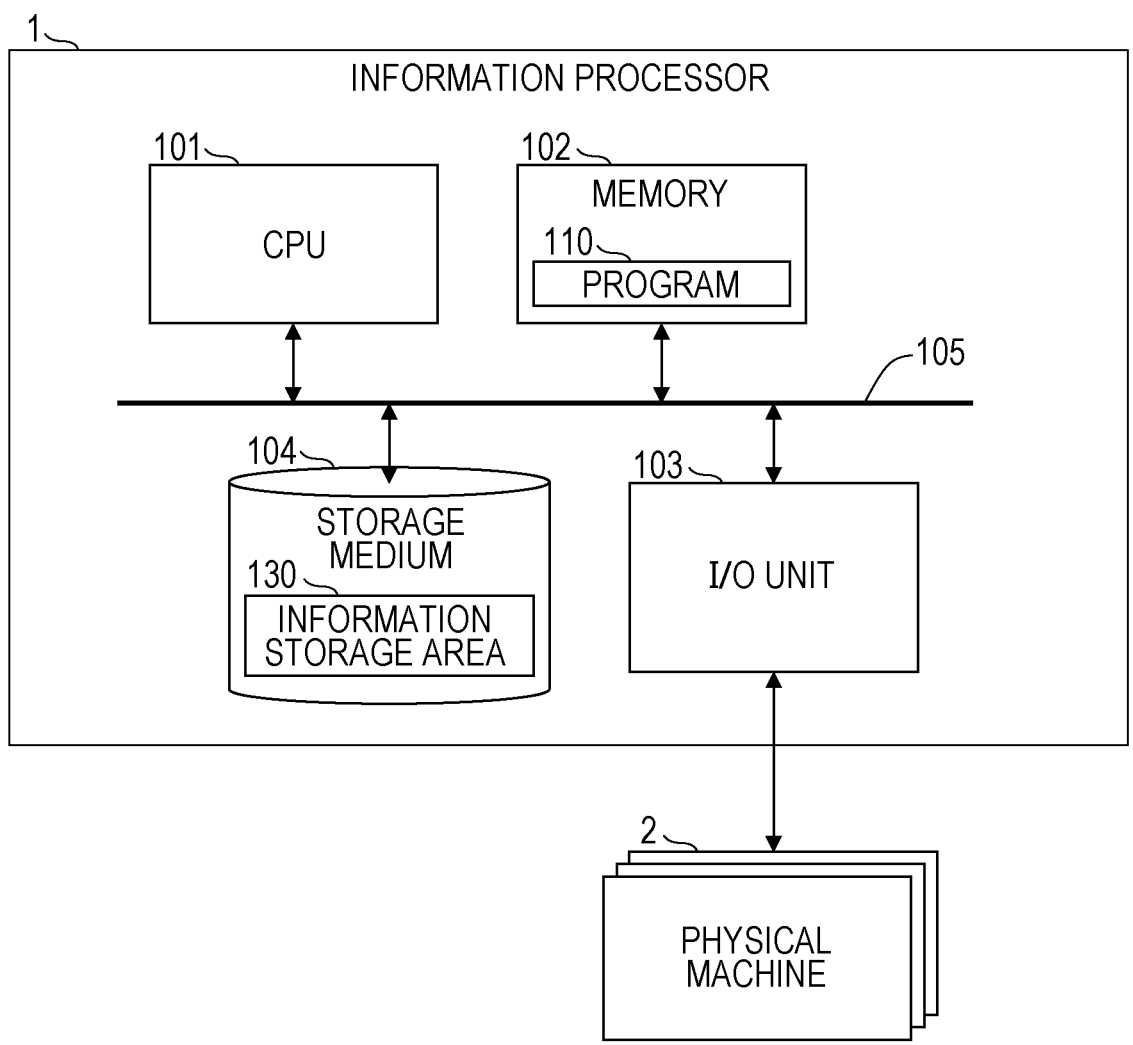
FIG. 2 is a diagram illustrating a hardware configuration of an information processor.

Next, a hardware configuration of the information processing system 10 is described. FIG. 2 is a diagram illustrating a hardware configuration of the information processor 1.

The information processor 1 includes a central processing unit (CPU) 101 that is a processor, a memory 102, an external interface (I/O unit) 103, and a storage medium 104. The respective components are connected to each other through a bus 105.

The storage medium 104 includes, for example, a program storage area (not illustrated) to store a program 110 for performing processing of determining the virtual machine 3 to be moved to the different physical machine 2 in the event of a failure (hereinafter also referred to as the failure handling processing). The storage medium 104 also includes, for example, an information storage area 130 (hereinafter also referred to as the storage unit 130) to store information for use in the failure handling processing. The storage medium 104 may be, for example, a hard disk drive (HDD).

The CPU 101 performs the failure handling processing by executing the program 110 loaded into the memory 102 from the storage medium 104.

The external interface 103 performs communication with the physical machine 2, for example.

[Functions of Information Processing System]

Figure 3:
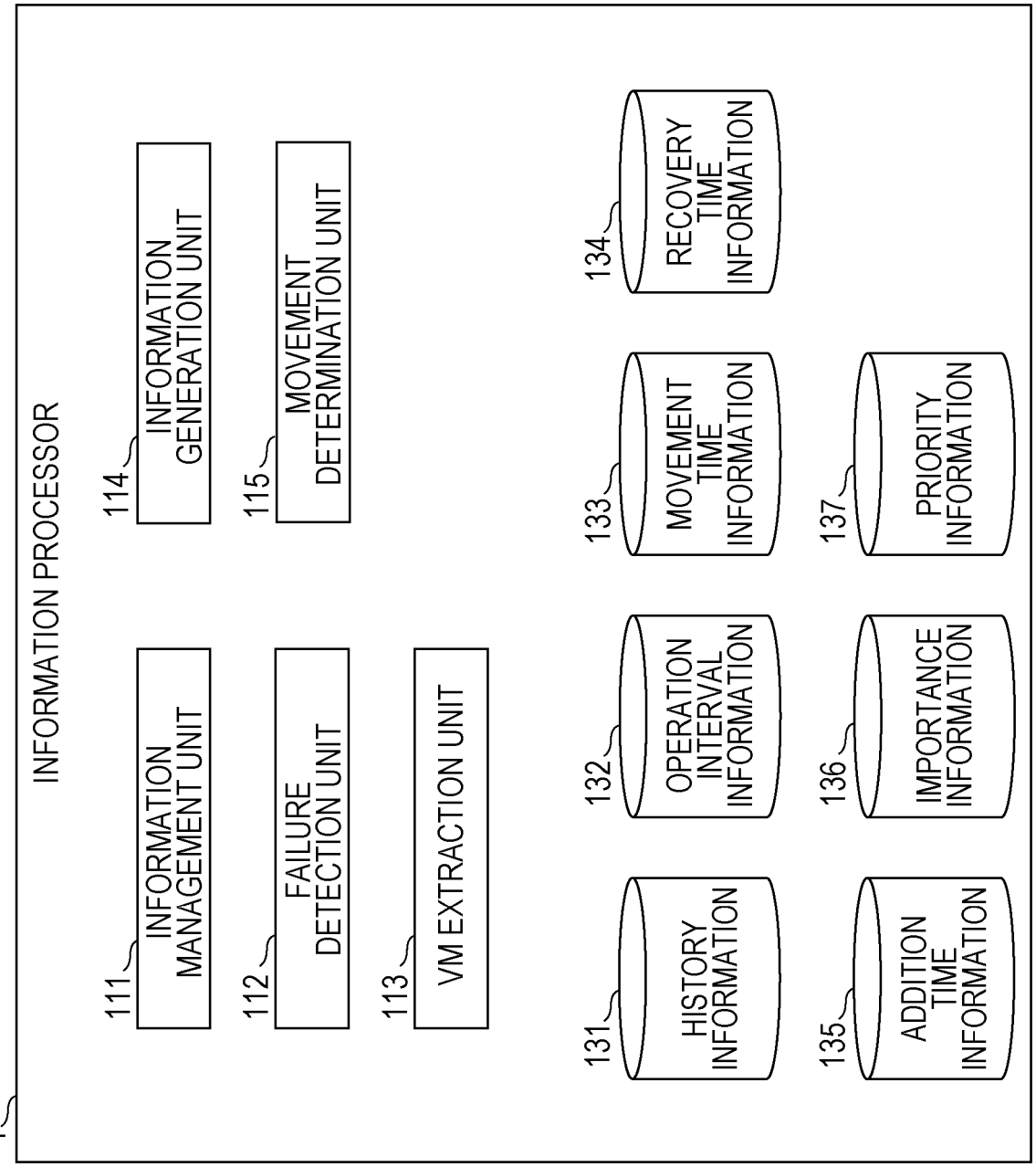
FIG. 3 is a functional block diagram of the information processor.

Next, description is given of functions of the information processing system 10. FIG. 3 is a functional block diagram of the information processor 1 with reference to FIG. 2.

The information processor 1 realizes various functions including an information management unit 111, a failure detection unit 112, a VM extraction unit 113, an information generation unit 114, and a movement determination unit 115, through organic cooperation between the hardware, such as the CPU 101 and the memory 102, and the program 110.

As illustrated in FIG. 3, the information processor 1 stores the history information 131, operation interval information 132, movement time information 133, recovery time information 134, addition time information 135, importance information 136, and priority information 137 in the information storage area 130.

The information management unit 111 generates the history information 131 to store in the information storage area 130. The history information 131 is, for example, information including the operation start time and the movement required time in the past for each virtual machine 3. The history information 131 is also, for example, information including the time required for recovery of a failure that has occurred in the past (hereinafter also referred to as the recovery required time) and predicted time for the recovery required time, which is predicted based upon the past occurrence of failure. A example of the history information 131 is described later.

The failure detection unit 112 detects occurrence of a failure that affects operations of the virtual machine 3. For example, the failure detection unit 112 regularly monitors states of the physical machine 2, a network, and the like. When the state of the physical machine 2 or the like becomes a predetermined state, the failure detection unit 112 determines that a failure has occurred, the failure having contents corresponding to the predetermined state.

Upon detection of the occurrence of the failure by the failure detection unit 112, the VM extraction unit 113 extracts the virtual machine 3 before starting its operation from among the virtual machines 3 within the range of influence of the failure. For example, the VM extraction unit 113 may refer to an operation schedule (not illustrated) for the virtual machine 3 stored in the information storage area 130, for example, to extract the virtual machine 3 scheduled to start its operation in the future from among the virtual machines 3 within the range of influence of the failure and currently not in operation.

The information generation unit 114 refers to the history information 131 stored in the information storage area 130 to generate the operation interval information 132 corresponding to time intervals of the operation start time for the virtual machine 3 extracted by the VM extraction unit 113. For example, the information generation unit 114 refers to the history information 131 stored in the information storage area 130 to specify the time intervals of the operation start time in the past for the virtual machine 3 extracted by the VM extraction unit 113. The information generation unit 114 generates information indicating a percentage for the same time interval (for example, the same time interval zone) as the operation interval information 132, for each of the specified time intervals of the operation start time.

The information generation unit 114 also refers to the history information 131 stored in the information storage area 130 to generate the movement time information 133 corresponding to the movement required time required to move the virtual machine 3 extracted by the VM extraction unit 113 to the different physical machine 2. For example, the information generation unit 114 refers to the history information 131 stored in the information storage area 130 to specify the movement required time in the past for the virtual machine 3 extracted by the VM extraction unit 113. The information generation unit 114 generates information indicating a percentage for the same movement required time (for example, the same movement required time zone) as the movement time information 133, for each of the specified movement required times.

The information generation unit 114 further generates the recovery time information 134 corresponding to the recovery required time required for recovery of the failure detected to have occurred by the failure detection unit 112. For example, the information generation unit 114 refers to the history information 131 stored in the information storage area 130 to calculate a time difference between the recovery required time upon the past occurrence of the failure detected by the failure detection unit 112 and the predicted time for the recovery required time, which is predicted based upon the past occurrence of the failure. The information generation unit 114 generates information indicating a percentage for the same time difference (for example, time difference zone) as the recovery time information 134, for each of the calculated time differences.

The movement determination unit 115 determines whether to move the virtual machine 3 extracted by the VM extraction unit 113 to the different physical machine 2, based on the operation interval information 132, the movement time information 133, and the recovery time information 134 generated by the information generation unit 114. The addition time information 135, the importance information 136, and the priority information 137 are described later.

Outline of First Embodiment

Figure 4:
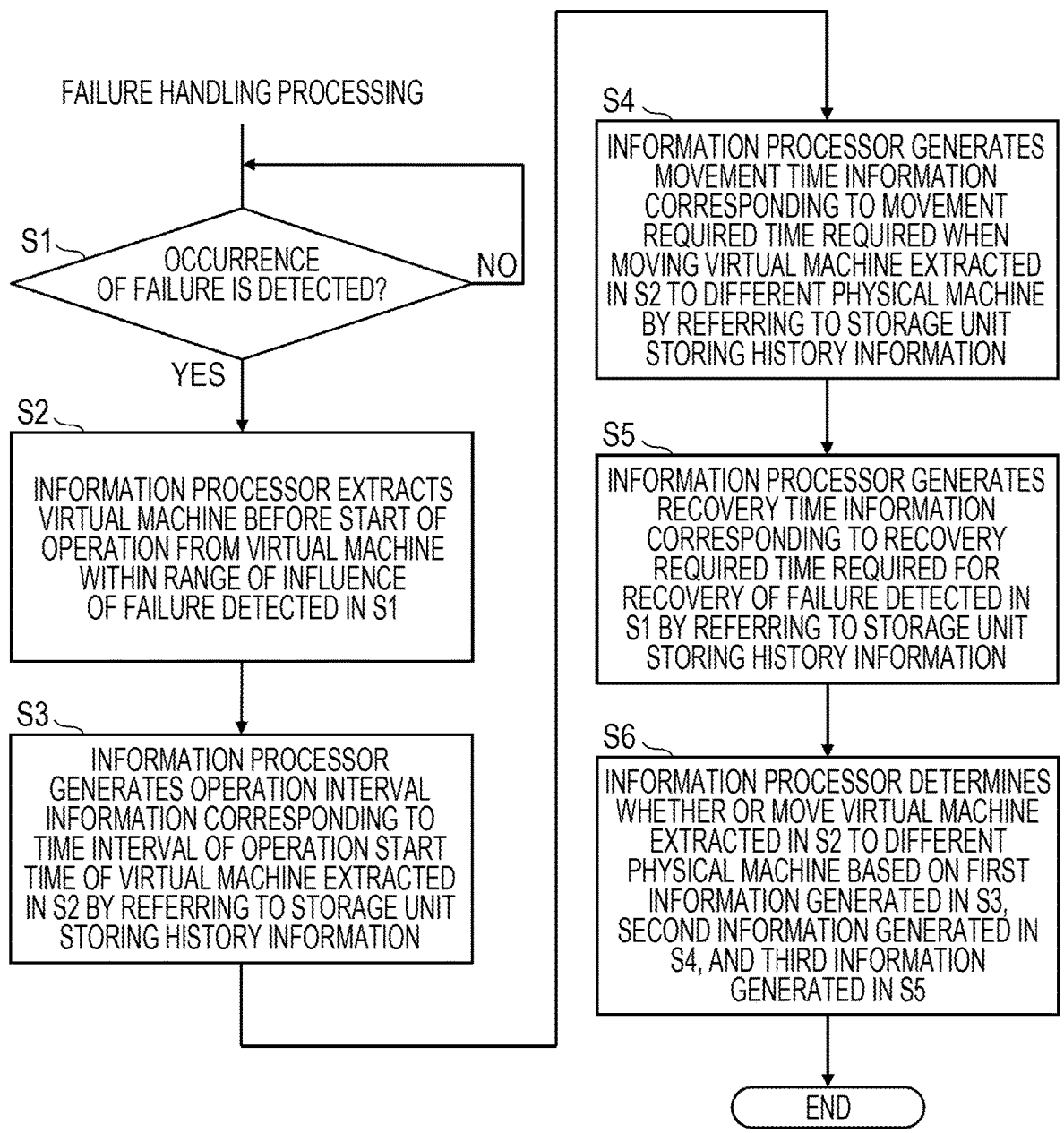
FIG. 4 is a flowchart explaining an outline of failure handling processing according to an embodiment.
Figure 5:
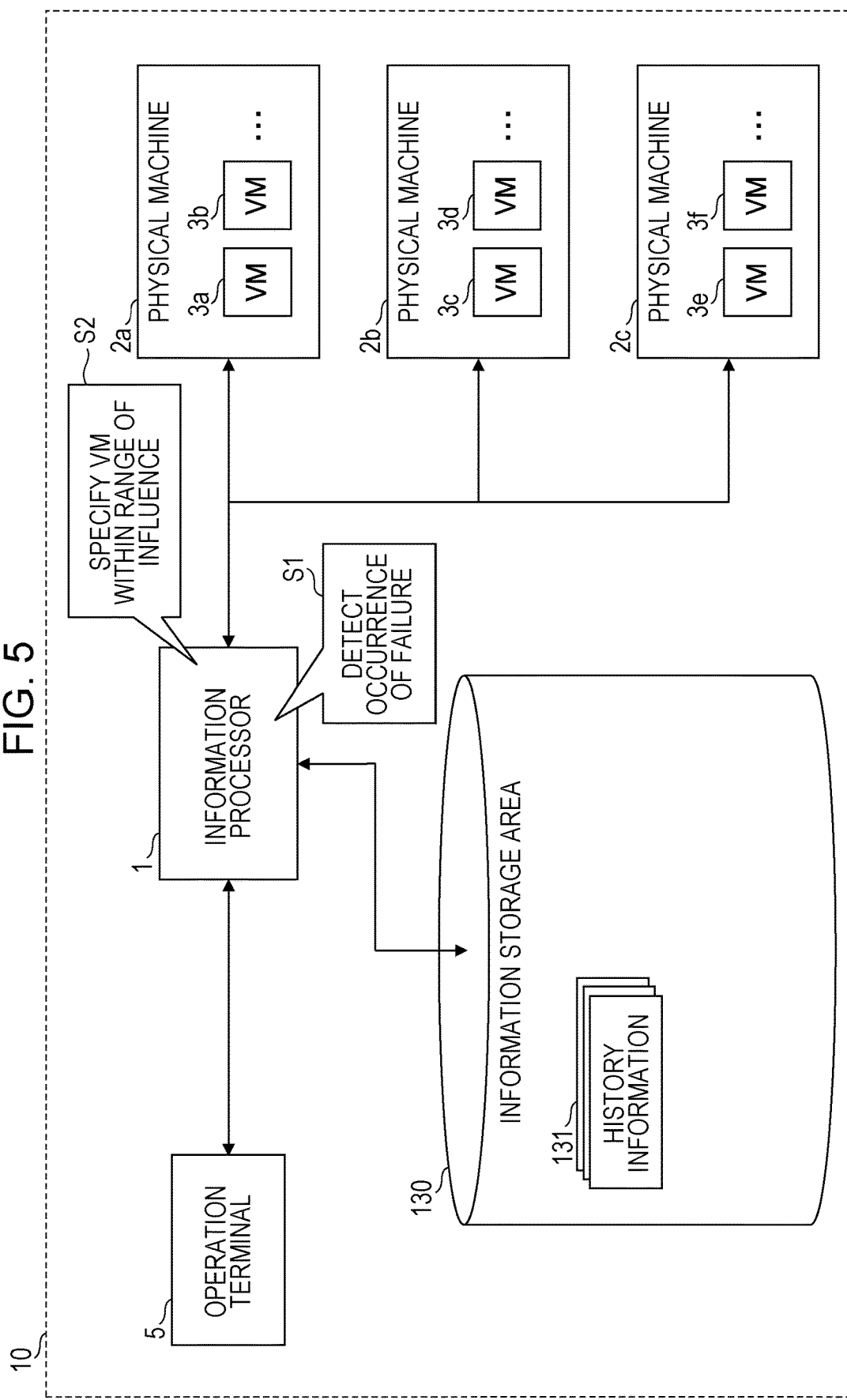
FIG. 5 is a diagram explaining the outline of the failure handling processing according to an embodiment.
Figure 6:
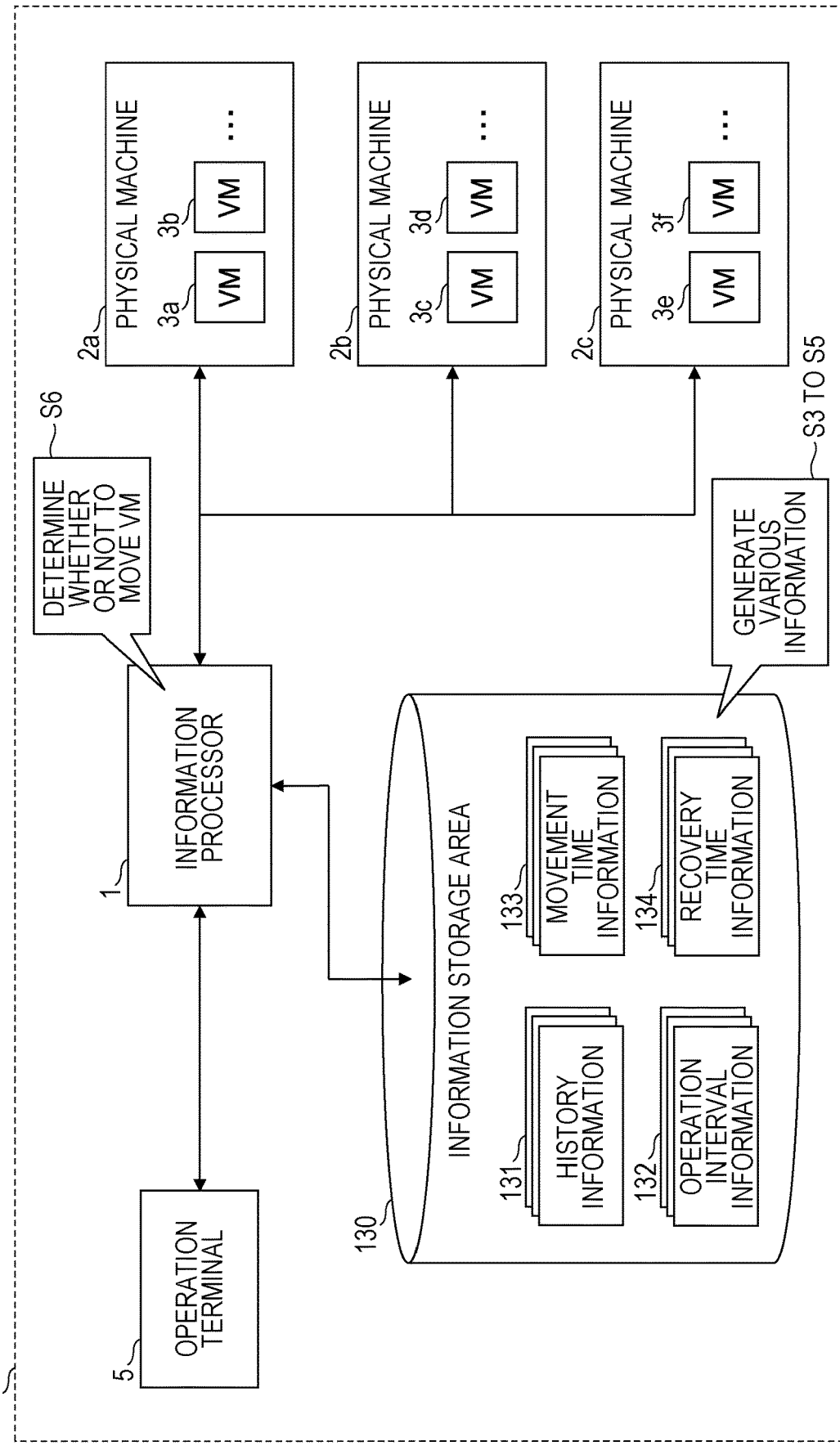
FIG. 6 is a diagram explaining the outline of the failure handling processing according to an embodiment.

Next, an outline of a first embodiment is described. FIG. 4 is a flowchart explaining an outline of failure handling processing according to the first embodiment. FIGS. 5 and 6 are diagrams explaining the outline of the failure handling processing according to the first embodiment.

As illustrated in FIG. 4, the information processor 1 waits until occurrence of a failure is detected (NO in S1). For example, the information processor 1 detects a failure occurring in each physical machine 2 or each virtual machine 3 by detecting output of an error from each physical machine 2 or each virtual machine 3.

When occurrence of a failure is detected (YES in S1), the information processor 1 extracts the virtual machine 3 before starting its operation from among the virtual machines 3 within the range of influence of the failure detected to have occurred (S2).

For example, the information processor 1 specifies a virtual machine 3 within the range of influence of the failure detected to have occurred in S1 and currently not in operation, from among a plurality of virtual machines 3 including virtual machines 3a and 3b operated in a physical machine 2a, a plurality of virtual machines 3 including virtual machines 3c and 3d operated in a physical machine 2b, and a plurality of virtual machines 3 including virtual machines 3e and 3f operated in a physical machine 2c, as illustrated in FIG. 5.

The information processor 1 refers to the information storage area 130 storing the history information 131 to generate operation interval information 132 corresponding to time intervals of the operation start time of the virtual machine 3 extracted in S2 (S3). The information processor 1 also refers to the information storage area 130 storing the history information 131 to generate movement time information 133 corresponding to movement required time required to move the virtual machine 3 extracted in S2 to a different physical machine 2 (S4). The information processor 1 further refers to the information storage area 130 storing the history information 131 to generate recovery time information 134 corresponding to recovery required time required for recovery of the failure detected to have occurred in S1 (S5).

The information processor 1 determines whether to move the virtual machine 3 extracted in S2 to the different physical machine 2, based on the operation interval information 132 generated in S3, the movement time information 133 generated in S4, and the recovery time information 134 generated in S5 (S6).

For example, the information processor 1 stores the generated operation interval information 132, movement time information 133, and recovery time information 134 in the information storage area 130, as illustrated in FIG. 6. When the virtual machines 3a and 3b are specified in S2, for example, the information processor 1 refers to the operation interval information 132, the movement time information 133, and the recovery time information 134 stored in the information storage area 130 to determine whether to move the virtual machines 3a and 3b to another physical machine 2 (physical machine 2 other than the physical machine 2a).

Thus, the information processor 1 may properly specify the virtual machine 3 required to be moved to the different physical machine 2 in the event of a failure. As a result, the operator may further suppress the influence of the failure that has occurred.

Details of First Embodiment

Next, description is given of details of the first embodiment. FIGS. 7 to 19 are flowcharts explaining details of failure handling processing according to the first embodiment. FIGS. 20 to 29 are diagrams explaining the details of the failure handling processing according to the first embodiment.

[History Information Accumulation Processing]

First, description is given of processing of accumulating the history information 131 (hereinafter also referred to as the history information accumulation processing) in the failure handling processing.

Figure 7:
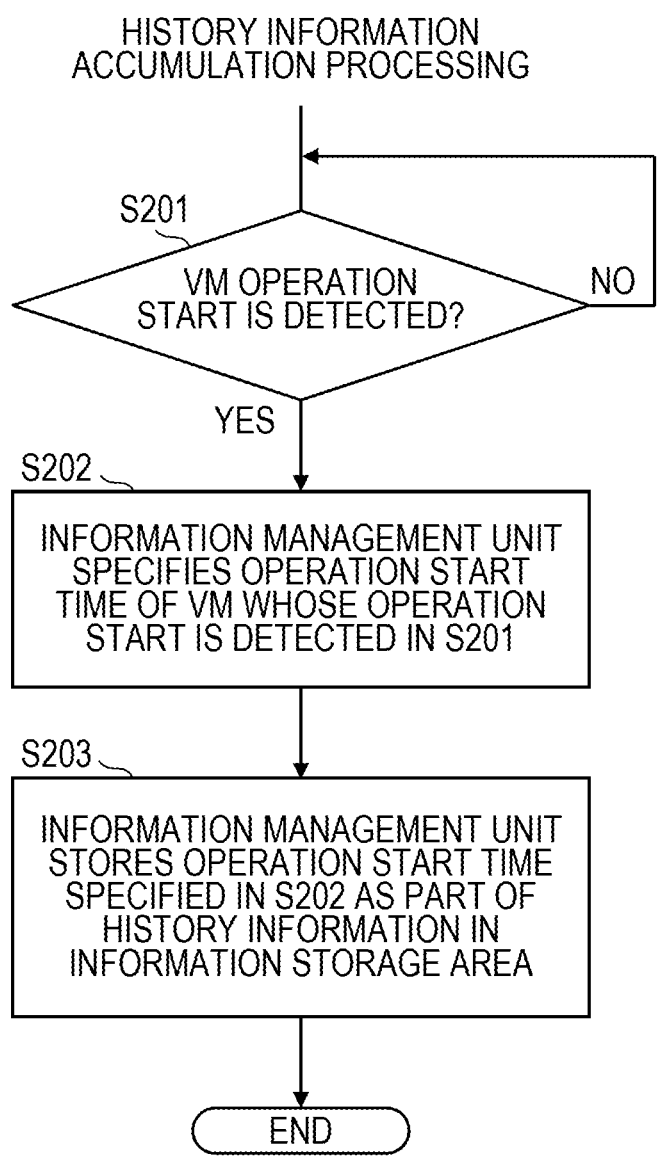
FIG. 7 is a flowchart explaining details of the failure handling processing according to an embodiment.

As illustrated in FIG. 7, the information management unit 111 in the information processor 1 waits until it is detected that the virtual machine 3 operated in the physical machine 2 has started its operation (NO in S201). For example, the information management unit 111 acquires CPU utilization of the virtual machine 3 operated in each physical machine 2 from each physical machine 2 or each virtual machine 3, and detects the start of the operation of each virtual machine 3 based on a change in CPU utilization for each virtual machine 3.

When it is detected that the virtual machine 3 has started its operation (YES in S201), the information management unit 111 specifies the operation start time of the virtual machine 3 detected to have started its operation (S202).

The information management unit 111 stores the operation start time specified in S202 as a part of the history information 131 (hereinafter also referred to as first history information 131a) in the information storage area 130 (S203).

Figure 8:
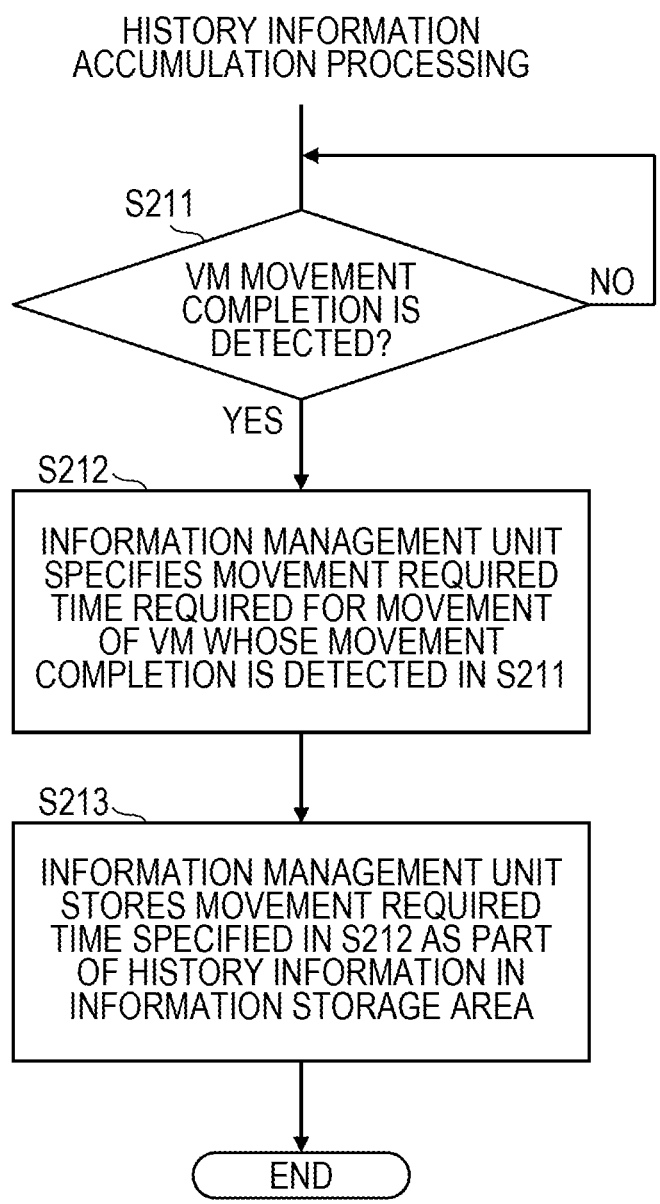
FIG. 8 is a flowchart explaining details of the failure handling processing according to an embodiment.

As illustrated in FIG. 8, the information management unit 111 waits until it is detected that the movement of the virtual machine 3 to the different physical machine 2 is completed (NO in S211). For example, the information management unit 111 waits until it is detected that live migration of the virtual machine 3 to the different physical machine 2 is completed.

When it is detected that the movement of the virtual machine 3 is completed (YES in S211), the information management unit 111 specifies movement required time required to move the virtual machine 3 detected to have completed its movement (S212). For example, the information management unit 111 detects not only the completion of the movement of the virtual machine 3 to the different physical machine 2 but also the start of movement of the virtual machine 3 to the different physical machine 2, and specifies the time from the start of movement to the completion of movement as the movement required time.

When the movement of the virtual machine 3 from one physical machine 2 to another physical machine 2 is started, each physical machine 2 may transmit information indicating the start of movement of the virtual machine 3 to the information processor 1. Likewise, when the movement of the virtual machine 3 from one physical machine 2 to another physical machine 2 is completed, each physical machine 2 may transmit information indicating the completion of movement of the virtual machine 3 to the information processor 1. The information management unit 111 may specify the movement required time by referring to the information transmitted from the physical machine 2.

The information management unit 111 stores the movement required time specified in S212 as a part of the history information 131 (hereinafter also referred to as second history information 131b) in the information storage area 130 (S213).

Figure 9:
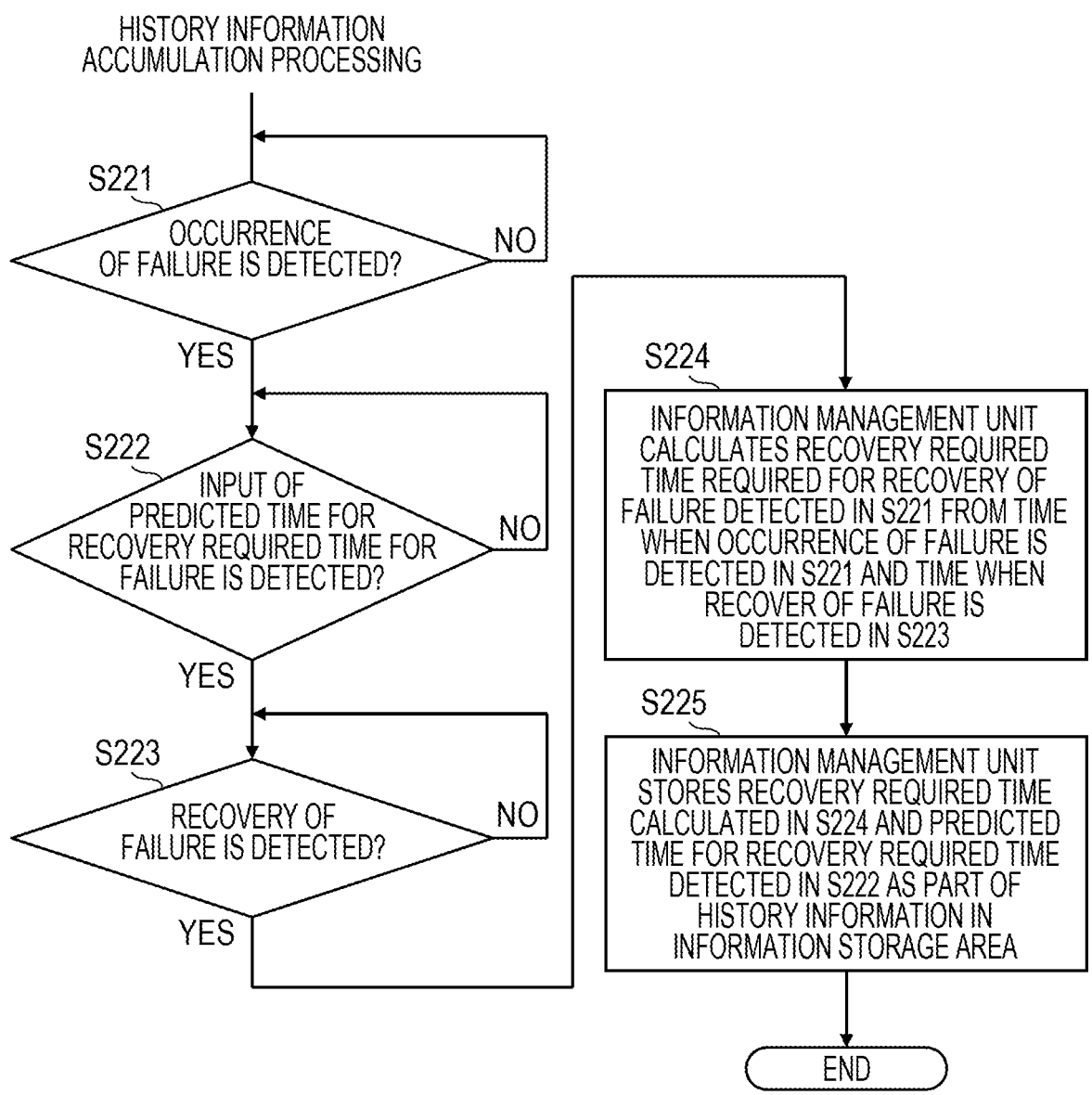
FIG. 9 is a flowchart explaining details of the failure handling processing according to an embodiment.

As illustrated in FIG. 9, the failure detection unit 112 in the information processor 1 waits until occurrence of a failure that affects the virtual machine 3 operated in the physical machine is detected (NO in S221). For example, the failure detection unit 112 detects the occurrence of the failure that affects each virtual machine 3 by detecting error information outputted from each physical machine 2 or each virtual machine 3.

When the occurrence of the failure is detected (YES in S221), the information management unit 111 waits until a predicted time for recovery required time for the failure that has occurred is inputted by the operator (NO in S222). For example, the information management unit 111 waits until the predicted time for the recovery required time for the failure that has occurred is inputted through the operation terminal 5.

When it is detected that the predicted time for the recovery required time for the failure that has occurred is inputted by the operator (YES in S222), the failure detection unit 112 waits until recovery of the failure that has occurred is detected (NO in S223). For example, the failure detection unit 112 waits until information indicating that the failure has been recovered is inputted by the operator.

When the recovery of the failure that has occurred is detected (YES in S223), the information management unit 111 calculates the recovery required time required for recovery of the failure detected to have occurred in S221, from the time when the occurrence of the failure is detected in S221 and the time when the recovery of the failure is detected in S223 (S224). For example, the information management unit 111 calculates the time from the time when the occurrence of the failure is detected in S221 to the time when the recovery of the failure is detected in S223, as the recovery required time.

The information management unit 111 stores the recovery required time calculated in S224 and the predicted time for the recovery required time detected to have been inputted in S222 as a part of the history information 131 (hereinafter also referred to as third history information 131*c*) in the information storage area 130 (S225).

Figure 10:
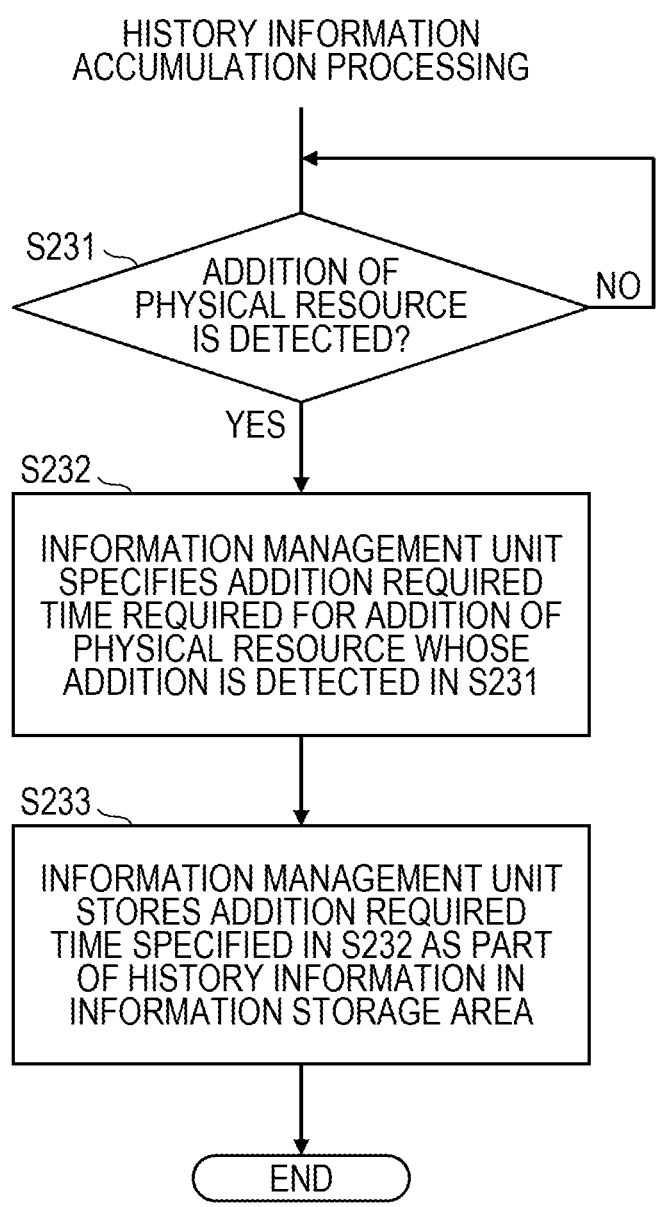
FIG. 10 is a flowchart explaining details of the failure handling processing according to an embodiment.

As illustrated in FIG. 10, the information management unit 111 further waits, for example, until addition of physical resources is detected (S231). For example, the information management unit 111 waits until information indicating completion of the addition of physical resources is inputted by the operator.

For example, when all the virtual machines 3 affected by the failure that has occurred may not be moved to the different physical machine 2, the operator suppresses the influence of the failure that has occurred, for example, by adding physical resources.

Such addition of the physical resources includes, for example, adding hardware to the physical machine 2, adding and switching a network for connection with the physical machine 2, adding a storage device accessible to the physical machine 2, changing settings for a data storage destination, and the like.

When the addition of the physical resources is detected (YES in S231), the information management unit 111 specifies addition required time required for the addition of the physical resources detected to be added (S232). For example, as the addition required time, the information management unit 111 specifies, for example, the time inputted by the operator as the time required for the addition of the physical resources.

The information management unit 111 stores the addition required time specified in S232 as a part of the history information 131 (hereinafter also referred to as fourth history information 131*d*) in the information storage area 130 (S233). A example of the history information 131 is described below.

[Example of History Information]

FIGS. 20A to 20D are diagrams explaining examples of the history information 131. For example, FIG. 20A is a diagram explaining a example of the first history information 131*a*, FIG. 20B is a diagram explaining a example of the second history information 131*b*, FIG. 20C is a diagram explaining a example of the third history information 131*c*, and FIG. 20D is a diagram explaining a example of the fourth history information 131*d*. The following description is given assuming that the first to fourth history information 131*a* to 131*d* are generated for each virtual machine 3 and for each physical machine 2 in which the virtual machine 3 is operated. The following description is also given assuming that FIGS. 20A to 20D are diagrams illustrating the first to fourth history information 131*a* to 131*d*, respectively, which are stored when one virtual machine 3 is operated in the physical machine 2*a* described with reference to FIG. 1 and the like.

The first history information 131*a* and the second history information 131*b* may be generated, for example, for each virtual machine 3, for each physical machine 2 in which the virtual machine 3 is operated, and for the number of the virtual machines 3 operated in the physical machine 2. The second history information 131*b* may be generated, for example, for each virtual machine 3, for each physical machine 2 in which the virtual machine 3 is operated, for the number of the virtual machines 3 operated in the physical machine 2, and also for each piece of environmental information such as CPU utilization and memory usage upon starting movement between the physical machines 2.

The third history information 131*c* may be generated, for example, for the number of the virtual machines 3 operated in the physical machine 2. The fourth history information 131*d* may be generated, for example, for each physical machine 2 in which the virtual machine 3 is operated.

[Example of First History Information]

First, a example of the first history information 131*a* is described.

The first history information 131*a* illustrated in FIG. 20A includes items of "item number" for identifying each information included in the first history information 131*a*, "operation start time" for storing the operation start time specified in S202, and "time interval" for storing the time interval of the consecutive times stored in "operation start time".

In the first history information 131*a* illustrated in FIG. 20A, for example, "12:05" is stored as "operation start time" in the information with "item number" of "1". In the first history information 131*a* illustrated in FIG. 20A, "-" indicating that no information is stored as "time interval" is stored in the information with "item number" of "1".

In the first history information 131*a* illustrated in FIG. 20A, "15:00" is stored as "operation start time" in the information with "item number" of "2". In the first history information 131*a* illustrated in FIG. 20A, information with "item number" of "2" includes "2:55" stored as "time interval", which is the time interval between the times "12:05" and "15:00" stored in "operation start time" for the information with "item number" of "1" and "2". As for the other information included in FIG. 20A, description thereof is omitted.

[Example of Second History Information]

Next, a example of the second history information 131*b* is described.

The second history information 131*b* illustrated in FIG. 20B includes items of "item number" for identifying each information included in the second history information 131*b* and "movement required time" for storing the movement required time specified in S212.

In the second history information 131*b* illustrated in FIG. 20B, for example, "2:10" is stored as "movement required time" in the information with "item number" of "1". In the second history information 131*b* illustrated in FIG. 20B, "1:40" is stored as "movement required time" in the information with "item number" of "2". As for the other information included in FIG. 20B, description thereof is omitted.

[Example of Third History Information]

Next, a example of the third history information 131c is described.

The third history information 131c illustrated in FIG. 20C includes items of "item number" for identifying each information included in the third history information 131c, "recovery required time" for storing the recovery required time calculated in S224, and "predicted time" for storing the predicted time for the recovery required time detected to have been inputted in S222. The third history information 131c illustrated in FIG. 20C also includes an item of "time difference" for storing a time difference calculated by subtracting the time stored in "predicted time" from the time stored in "recovery required time".

In the third history information 131c illustrated in FIG. 20C, for example, the information with "item number" of "1" includes "4:30" stored as "recovery required time", "4:00" stored as "predicted time", and "+0:30" stored as "time difference".

In the third history information 131c illustrated in FIG. 20C, for example, the information with "item number" of "2" includes "1:15" stored as "recovery required time", "2:00" stored as "predicted time", and "−0:45" stored as "time difference". As for the other information included in FIG. 20C, description thereof is omitted.

The third history information 131c may be generated, for example, according to type of the failure that has occurred. Alternatively, the third history information 131c may be generated, for example, according to person in charge of dealing with the failure that has occurred.

[Example of Fourth History Information]

Next, a example of the fourth history information 131d is described.

The fourth history information 131d illustrated in FIG. 20D includes items of "item number" for identifying each information included in the fourth history information 131d and "addition required time" for storing the addition required time specified in S232.

In the fourth history information 131d illustrated in FIG. 20D, for example, "0:10" is stored as "addition required time" in the information with "item number" of "1". In the fourth history information 131d illustrated in FIG. 20D, "0:10" is stored as "addition required time" in the information with "item number" of "2". As for the other information included in FIG. 20D, description thereof is omitted.

The fourth history information 131d may be generated, for example, according to type of the physical resources added. Alternatively, the fourth history information 131d may be generated, for example, according to size of the physical resources added.

[VM Movement Determination Processing]

Next, description is given of processing of specifying the virtual machine 3 to be moved to the different physical machine 2 (hereinafter also referred to as the VM movement determination processing) in the failure handling processing.

Figure 11:
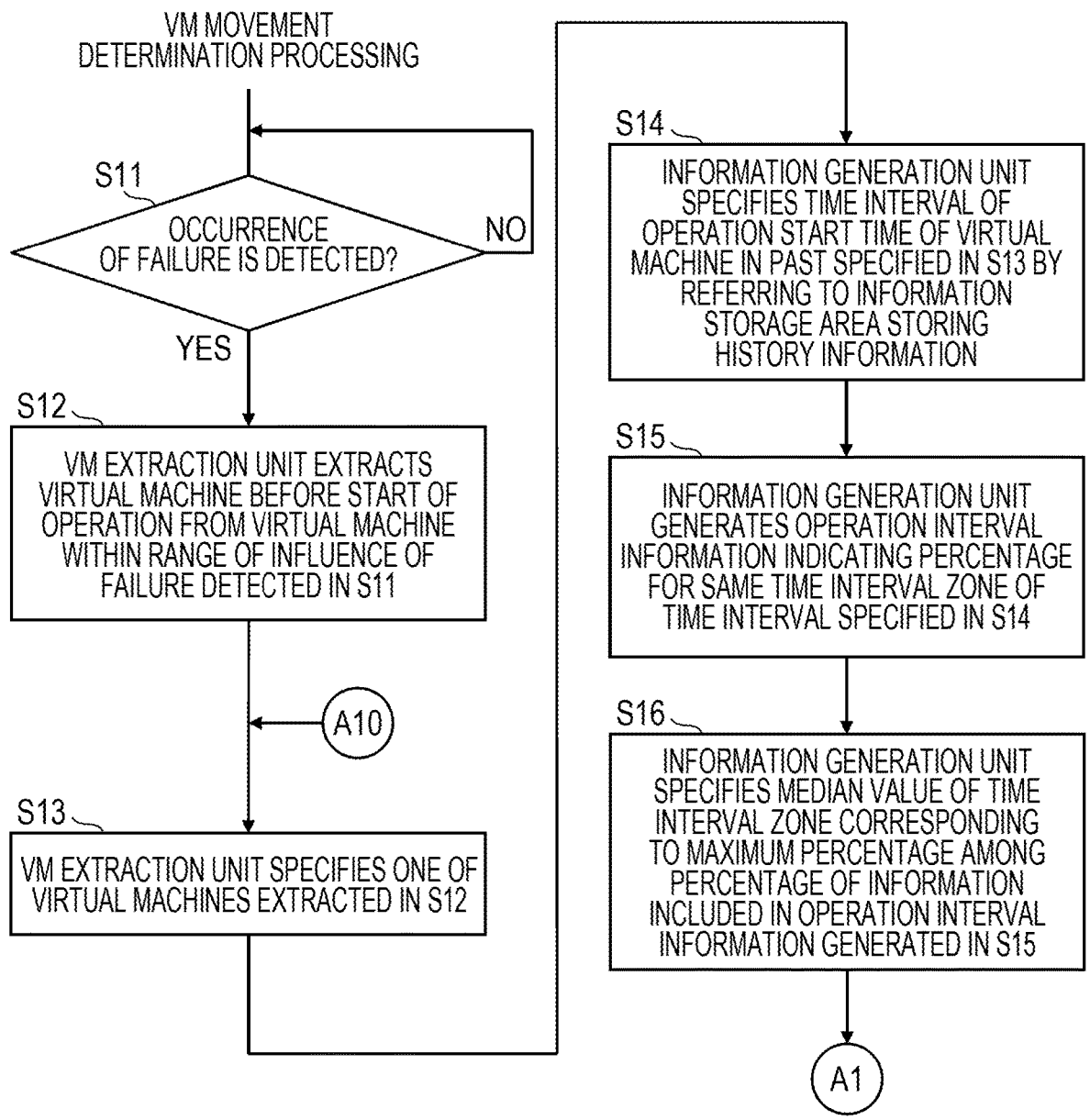
FIG. 11 is a flowchart explaining details of the failure handling processing according to an embodiment.

As illustrated in FIG. 11, the failure detection unit 112 waits until occurrence of a failure is detected (NO in S11). When the occurrence of the failure is detected (YES in S11), the VM extraction unit 113 in the information processor 1 extracts the virtual machine 3 before starting its operation from among the virtual machines 3 within the range of influence of the failure detected to have occurred (S12).

The VM extraction unit 113 specifies one of the virtual machines 3 extracted in S12 (S13).

The information generation unit 114 in the information processor 1 refers to the information storage area 130 storing the first history information 131a to specify the time interval between the operation start times in the past for the virtual machine 3 specified in S13 (S14).

For example, the information generation unit 114 specifies the physical machine 2 in which the virtual machine 3 specified in S13 is operated. The information generation unit 114 refers to the information corresponding to the specified physical machine 2 and to the virtual machine 3 specified in S13, among the first history information 131a, for example, to specify the time interval between the operation start times in the past for the virtual machine 3 specified in S13.

The information generation unit 114 further generates operation interval information 132 indicating the percentage for the same time interval zone of the time interval specified in S14 (S15). A example of the operation interval information 132 is described below.

[Example of Operation Interval Information]

FIGS. 21A to 21D are diagrams explaining examples of the operation interval information 132, the movement time information 133, the recovery time information 134, and the addition time information 135. For example, FIG. 21A is a diagram explaining a example of the operation interval information 132.

The operation interval information 132 illustrated in FIG. 21A includes items of "item number" for identifying each information included in the operation interval information 132, "time interval zone" for storing the range of time intervals, and "percentage" for storing the percentage of the information stored in "time interval zone" in the whole information.

In the operation interval information 132 illustrated in FIG. 21A, for example, the information with "item number" of "1" includes "2:45 to 3:00" stored as "time interval zone" and "10(%)" stored as "percentage". In the operation interval information 132 illustrated in FIG. 21A, the information with "item number" of "2" includes "3:00 to 3:15" stored as "time interval zone" and "15(%)" stored as "percentage". As for the other information included in FIG. 21A, description thereof is omitted.

Referring back to FIG. 11, the information generation unit 114 specifies a median value of the time interval zone corresponding to the highest percentage among percentage of the information included in the operation interval information 132 generated in S15 (S16). A example of the processing in S16 is described below.

[Example of Processing in S16]

Figure 22A:
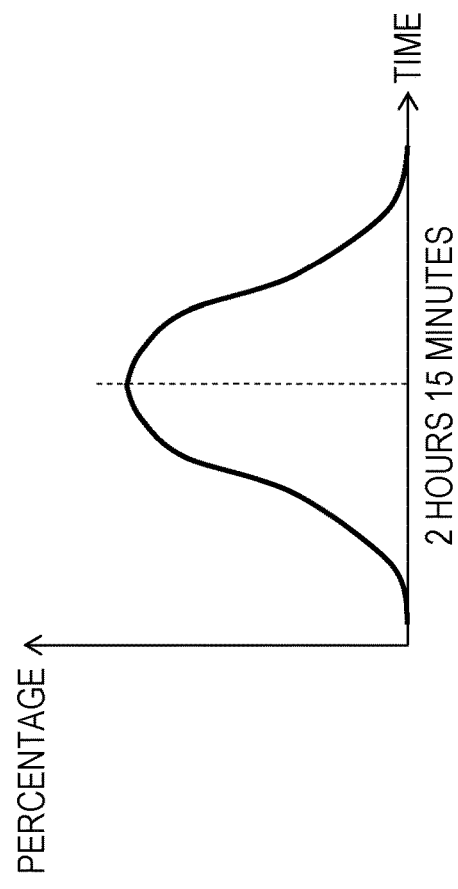
FIGS. 22A to 22D are diagrams explaining examples of graphs illustrating the operation interval information, the movement time information, the recovery time information, and the addition time information.

FIGS. 22A to 22D are diagrams explaining examples of graphs illustrating the operation interval information 132, the movement time information 133, the recovery time information 134, and the addition time information 135 illustrated in FIGS. 21A to 21D. For example, FIG. 22A is a diagram explaining a example of the graph illustrating the operation interval information 132. The horizontal axis and the vertical axis in each of the graphs illustrated in FIGS. 22A to 22D correspond to time and percentage, respectively.

In the operation interval information 132 illustrated in FIG. 21A, the time interval zone corresponding to the highest percentage (time interval zone) is "3:15 to 3:30". Therefore, in this case, as illustrated in FIG. 22A, the information generation unit 114 specifies 3 hours 22 minutes 30 seconds, which is the median value between 3 hours 15 minutes and 3 hours 30 minutes, as the median value of the time interval zone corresponding to the highest percentage, among the percentage information included in the operation interval information 132 generated in S15.

In S16, the information generation unit 114 may calculate the periodicity by performing autocorrelation analysis using resource information (for example, CPU utilization of each physical machine 2, and the like) acquired from each physical machine 2 or each virtual machine 3, instead of using the time interval zone included in the first history information 131a described with reference to FIG. 20A, for example, and specify the median value of the time interval zone from the calculated periodicity.

Figure 12:
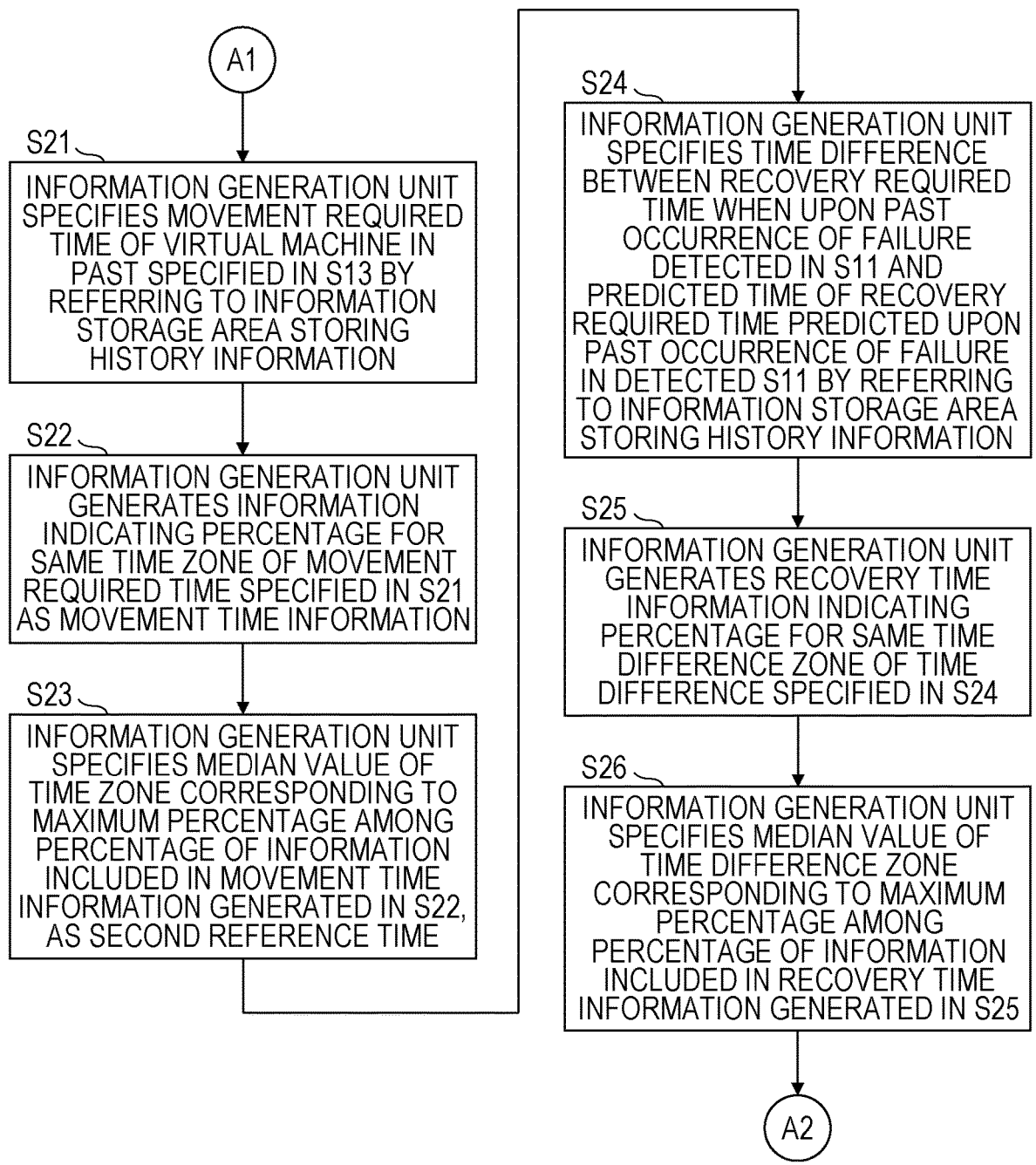
FIG. 12 is a flowchart explaining details of the failure handling processing according to an embodiment.

Referring to FIG. 12, the information generation unit 114 refers to the information storage area 130 storing the second history information 131b to specify the movement required time of the virtual machine 3 in the past specified in S13 (S21).

For example, the information generation unit 114 specifies the physical machine 2 in which the virtual machine 3 specified in S13 is operated. The information generation unit 114 refers to the information corresponding to the specified physical machine 2 and the virtual machine 3 specified in S13, among the second history information 131b, for example, to specify the movement required time of the virtual machine 3 in the past specified in S13.

The information generation unit 114 generates information indicating the percentage for the same time zone of the movement required time specified in S21, as the movement time information 133 (S22). A example of the movement time information 133 is described below.

[Example of Movement Time Information]

FIG. 21B is a diagram explaining a example of the movement time information 133.

The movement time information 133 illustrated in FIG. 21B includes items of "item number" for identifying each information included in the movement time information 133, "movement required time zone" for storing the range of movement required times, and "percentage" for storing the percentage of the information stored in "movement required time zone" in the whole information.

In the movement time information 133 illustrated in FIG. 21B, for example, the information with "item number" of "1" includes "0:30 to 1:00" stored as "movement required time zone" and "6(%)" stored as "percentage". In the movement time information 133 illustrated in FIG. 21B, the information with "item number" of "2" includes "1:00 to 1:30" stored as "movement required time zone" and "11(%)" stored as "percentage". As for the other information included in FIG. 21B, description thereof is omitted.

Referring back to FIG. 12, the information generation unit 114 specifies a median value of the time zone corresponding to the highest percentage among the percentage of the information included in the movement time information 133 generated in S22, as a second reference time (S23). A example of the processing in S23 is described below.

[Example of Processing in S23]

Figure 22B:
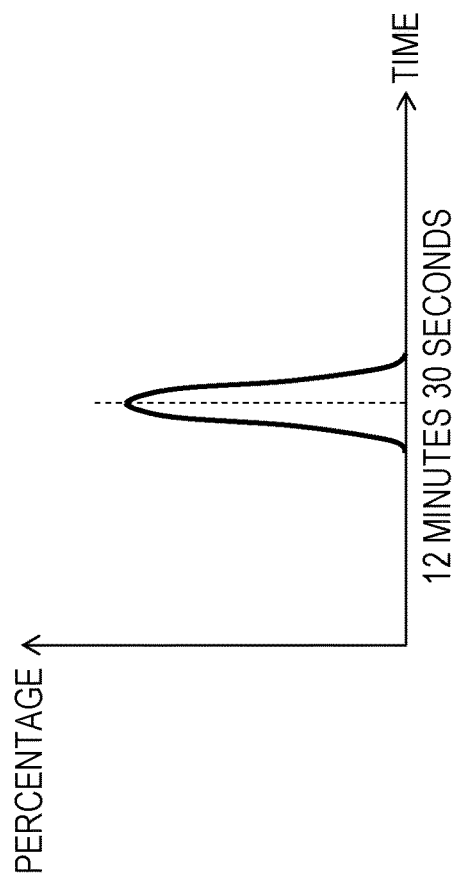

FIG. 22B is a diagram explaining a example of the graph illustrating the movement time information 133.

In the movement time information 133 illustrated in FIG. 21B, the time zone corresponding to the highest percentage (movement required time zone) is "2:00 to 2:30". Therefore, in this case, the information generation unit 114 specifies 2 hours 15 minutes, which is the median value between 2 hours and 2 hours 30 minutes, as a second reference time, as illustrated in FIG. 22B.

Referring back to FIG. 12, the information generation unit 114 refers to the information storage area 130 storing the third history information 131c to specify a time difference between the recovery required time upon past occurrence of the failure detected to have occurred in S11 and the predicted time for the recovery required time predicted upon past occurrence of the failure that has occurred in S11 (S24).

For example, the information generation unit 114 specifies the physical machine 2 in which the virtual machine 3 specified in S13 is operated. The information generation unit 114 refers to the information corresponding to the specified physical machine 2 and the virtual machine 3 specified in S13, among the third history information 131c, and specifies a time difference between the recovery required time upon past occurrence of the failure detected to have occurred in S11 and the predicted time for the recovery required time predicted upon past occurrence of the failure that has occurred in S11.

The information generation unit 114 generates recovery time information 134 indicating the percentage for the same time difference zone of the time difference specified in S24 (S25). A example of the recovery time information 134 is described below.

[Example of Recovery Time Information]

FIG. 21C is a diagram explaining a example of the recovery time information 134.

The recovery time information 134 illustrated in FIG. 21C includes items of "item number" for identifying each information included in the recovery time information 134, "time difference zone" for storing the range of time differences, and "percentage" for storing the percentage of the information stored in "time difference zone" in the whole information.

In the recovery time information 134 illustrated in FIG. 21C, for example, the information with "item number" of "1" includes "−0:45 to −0:30" stored as "time difference zone" and "5(%)" stored as "percentage". In the recovery time information 134 illustrated in FIG. 21C, the information with "item number" of "2" includes "−0:30 to −0:15" stored as "time difference zone" and "12(%)" stored as "percentage". As for the other information included in FIG. 21C, description thereof is omitted.

Referring back to FIG. 12, the information generation unit 114 specifies a median value of the time difference zone corresponding to the highest percentage among the percentage of the information included in the recovery time information 134 generated in S25 (S26). A example of the processing in S26 is described below.

[Example of Processing in S26]

Figure 22C:
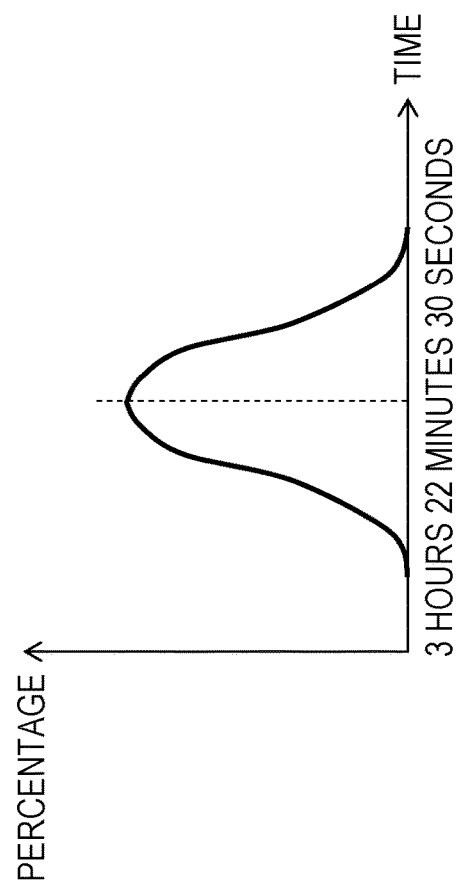

FIG. 22C is a diagram explaining a example of the graph illustrating the recovery time information 134.

In the recovery time information 134 illustrated in FIG. 21C, the time difference zone corresponding to the highest percentage is "0:00 to 0:15". Therefore, in this case, the information generation unit 114 specifies 7 minutes 30 seconds, which is the median value between 0 minutes and 15 minutes, as the median value of the time difference zone corresponding to the highest percentage, among the percentage information included in the recovery time information 134 generated in S25, as illustrated in FIG. 22C.

Figure 13:
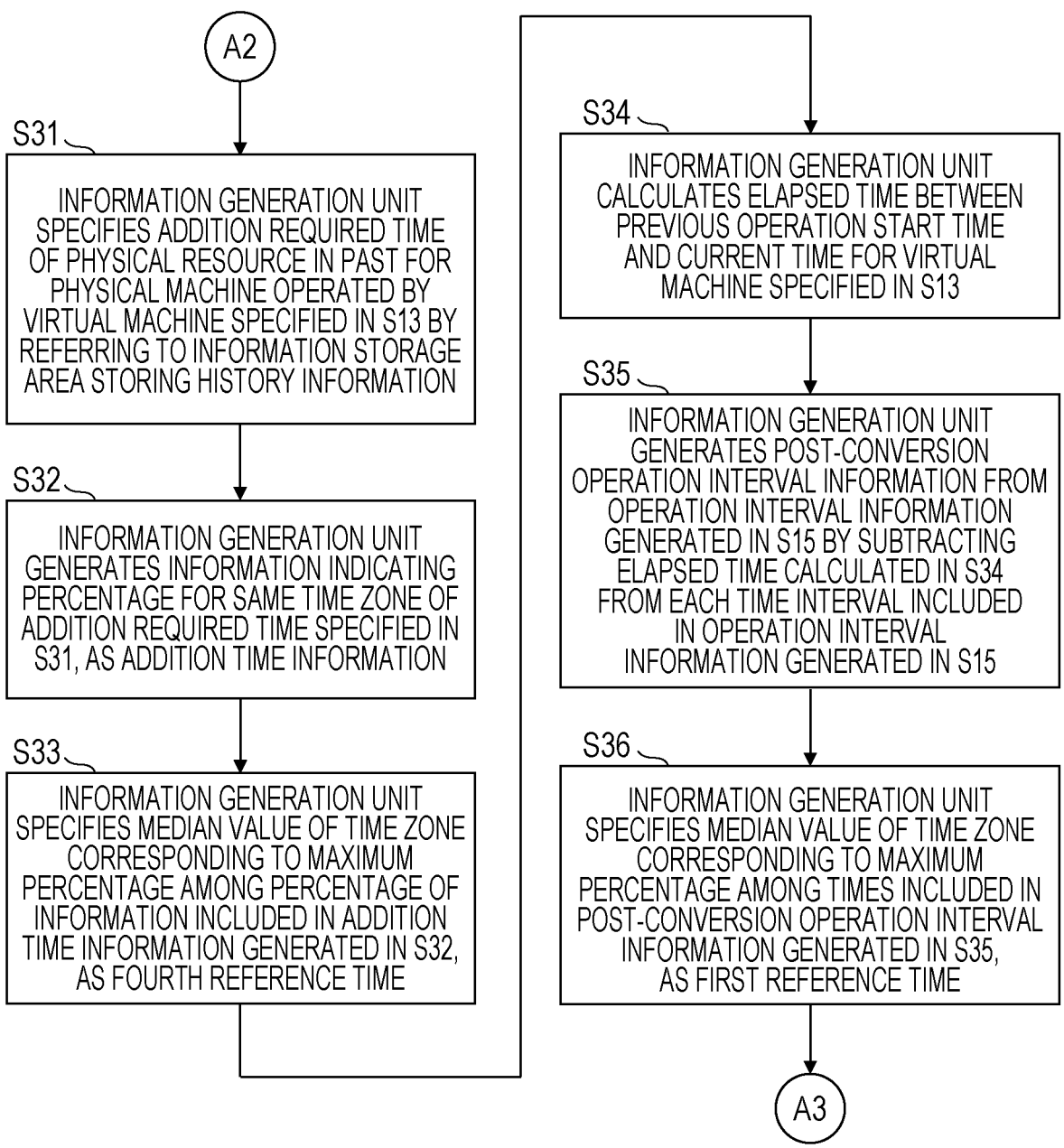
FIG. 13 is a flowchart explaining details of the failure handling processing according to an embodiment.

Referring to FIG. 13, the information generation unit 114 refers to the information storage area 130 storing the fourth history information 131d to specify, for example, a physical resource addition required time in the past for the physical machine 2 in which the virtual machine 3 specified in S13 is operated (S31).

For example, the information generation unit 114 specifies the physical machine 2 in which the virtual machine 3 specified in S13 is operated. The information generation unit 114 refers to the information corresponding to the specified physical machine 2 and the virtual machine 3 specified in S13, among the fourth history information 131d, and specifies the physical resource addition required time in the past for the physical machine 2 in which the virtual machine 3 specified in S13 is operated.

The information generation unit 114 generates information indicating the percentage for the same time zone of the addition required time specified in S31, as the addition time information 135 (S32). A example of the addition time information 135 is described below.

[Example of Addition Time Information]

FIG. 21D is a diagram explaining a example of the addition time information 135.

The addition time information 135 illustrated in FIG. 21D includes items of "item number" for identifying each information included in the addition time information 135, "addition required time zone" for storing the range of addition required times, and "percentage" for storing the percentage of the information stored in "addition required time zone" in the whole information.

In the addition time information 135 illustrated in FIG. 21D, for example, the information with "item number" of "1" includes "0:00 to 0:05" stored as "addition required time zone" and "2(%)" stored as "percentage". In the addition time information 135 illustrated in FIG. 21D, for example, the information with "item number" of "2" includes "0:05 to 0:10" stored as "addition required time zone" and "15(%)" stored as "percentage". As for the other information included in FIG. 21D, description thereof is omitted.

Referring back to FIG. 13, the information generation unit 114 specifies a median value of the time zone corresponding to the highest percentage among the percentage of the information included in the addition time information 135 generated in S32, as a fourth reference time (S33). A example of the processing in S33 is described below.

[Example of Processing in S33]

Figure 22D:
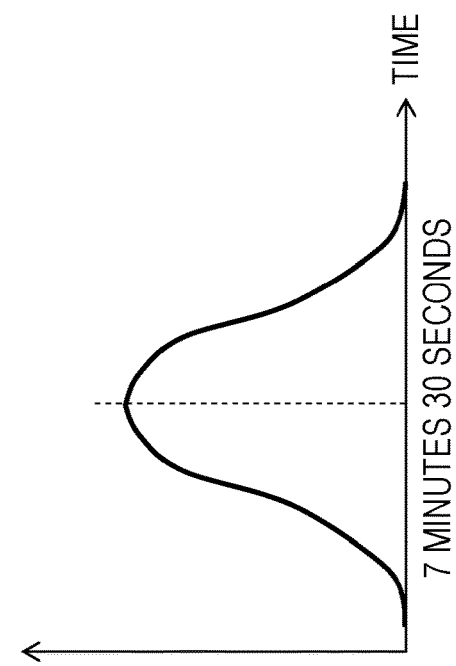

FIG. 22D is a diagram explaining a example of the graph illustrating the addition time information 135.

In the addition time information 135 illustrated in FIG. 21D, the time zone corresponding to the highest percentage (addition required time zone) is "0:10 to 0:15". Therefore, in this case, the information generation unit 114 specifies 12 minutes 30 seconds, which is the median value between 10 minutes and 15 minutes, as the fourth reference time, as illustrated in FIG. 22D.

Referring back to FIG. 13, the information generation unit 114 calculates an elapsed time from the previous operation start time for the virtual machine 3 specified in S13 to the current time (S34). The information generation unit 114 generates post-conversion operation interval information 132*a* from the operation interval information 132 generated in S15, by subtracting the elapsed time calculated in S34 from each time interval included in the operation interval information 132 generated in S15 (S35).

For example, while the origin of the horizontal axis of the graph representing the movement time information 133 illustrated in FIG. 22B corresponds to the current time, the origin of the horizontal axis of the graph representing the operation interval information 132 illustrated in FIG. 22A corresponds to the previous operation start time for the virtual machine 3 specified in S13. Therefore, the information generation unit 114 generates the post-conversion operation interval information 132*a* in which the origin of the horizontal axis of the graph representing the operation interval information 132 corresponds to the current time. Thus, the information processor 1 may compare the graph representing the post-conversion operation interval information 132*a* with the graph representing the movement time information 133, and the like. A example of the post-conversion operation interval information 132*a* generated in S35 is described below.

[Example of Post-Conversion Operation Interval Information]

Figures 23, 24:
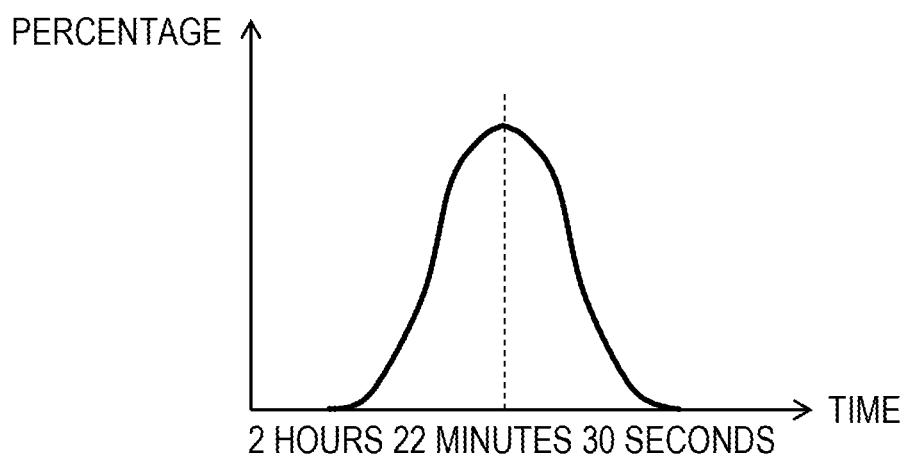
FIG. 23 is a diagram explaining an example of post-conversion operation interval information.
FIG. 24 is a diagram explaining an example of a graph illustrating the post-conversion operation interval information.

FIG. 23 is a diagram explaining a example of the post-conversion operation interval information 132*a*. FIG. 24 is a diagram explaining a example of a graph illustrating the post-conversion operation interval information 132*a*.

The post-conversion operation interval information 132*a* illustrated in FIG. 23 includes items of "item number" for identifying each information included in the post-conversion operation interval information 132*a*, "operation start required time zone" for storing time before the next operation start time, and "percentage" for storing the percentage of the information stored in "operation start required time zone" in the whole information.

For example, when the elapsed time calculated in S34 is 1 hour, the information generation unit 114 stores, in "operation start required time zone", time obtained by subtracting "1:00" from the time stored in "time interval zone" in the operation interval information 132 described with reference to FIG. 21A, as illustrated in FIG. 24.

Therefore, in this case, the graph representing the post-conversion operation interval information 132*a* has the same shape as that of the graph described with reference to FIG. 22A, as illustrated in FIG. 24. In the graph representing the post-conversion operation interval information 132*a*, 2 hours 22 minutes 30 seconds is the time corresponding to the highest percentage, which is obtained by subtracting 1 hour from 3 hours 22 minutes 30 seconds that is the time corresponding to the highest percentage in the graph described with reference to FIG. 22A, as illustrated in FIG. 24.

Referring back to FIG. 13, the information generation unit 114 specifies a median value of the time zone corresponding to the highest percentage among the times included in the post-conversion operation interval information 132*a* generated in S35, as a first reference time (S36).

For example, the information generation unit 114 specifies 2 hours 22 minutes 30 seconds as the first reference time, which is the median value between 2 hours 15 minutes and 2 hours 30 minutes as the time zone corresponding to the highest percentage, among the percentage information included in the post-conversion operation interval information 132*a* generated in S35, as illustrated in FIG. 23.

As illustrated in FIG. 14, the information generation unit 114 determines whether or not the predicted time (hereinafter also referred to as the third reference time) for the recovery required time of the failure detected to have occurred in S11 is inputted (S41).

As a result, when it is determined that the input of the third reference time is not detected (NO in S41), the information generation unit 114 waits until the input of the third reference time is detected.

When the input of the third reference time is detected (YES in S41), the information generation unit 114 generates post-conversion recovery time information 134*a* from the recovery time information 134 generated in S25 by allowing the time difference specified in S26 to correspond to the third reference time detected to be inputted in S41 (S42).

For example, the information generation unit 114 generates the post-conversion recovery time information 134*a* from the recovery time information 134 so as to enable comparison with the graph representing the movement time information 133, and the like. A example of the post-conversion recovery time information 134a generated in S42 is described below.

[Example of Post-Conversion Recovery Time Information]

Figures 25, 26:
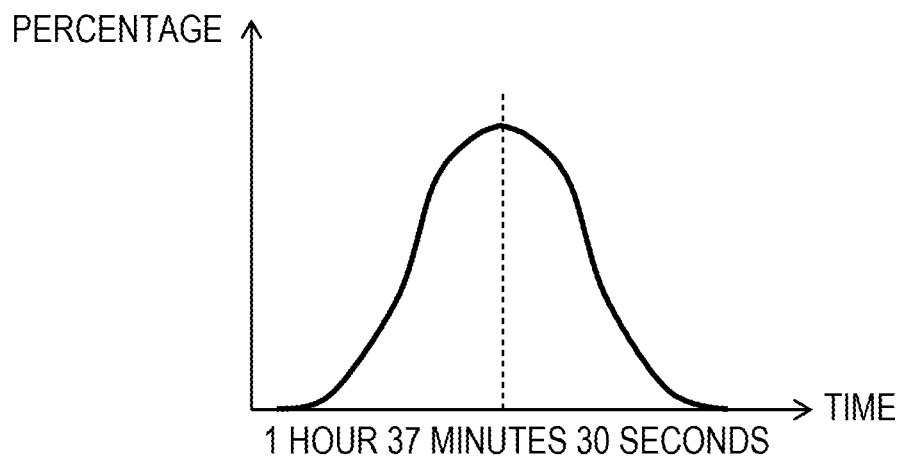
FIG. 25 is a diagram explaining an example of post-conversion recovery time information.
FIG. 26 is a diagram explaining an example of a graph illustrating the post-conversion recovery time information.

FIG. 25 is a diagram explaining a example of the post-conversion recovery time information 134a. FIG. 26 is a diagram explaining a example of a graph illustrating the post-conversion recovery time information 134a.

The post-conversion recovery time information 134a illustrated in FIG. 25 includes items of "item number" for identifying each information included in the post-conversion recovery time information 134a, "recovery required time" for storing recovery required time, and "percentage" for storing the percentage of the information stored in "recovery required time" in the whole information.

For example, when the third reference time detected to be inputted in S41 is 1 hour 30 minutes, the information generation unit 114 stores, in "recovery required time", time obtained by adding "1:30" to the time stored in "time difference zone" in the recovery time information 134 described with reference to FIG. 21C, as illustrated in FIG. 26.

Therefore, in this case, the graph representing the post-conversion recovery time information 134a has the same shape as that of the graph described with reference to FIG. 22C, as illustrated in FIG. 26. In the graph representing the post-conversion recovery time information 134a, in this case, 1 hour 37 minutes 30 seconds is the time corresponding to the highest percentage, which is obtained by adding 1 hour 30 minutes to 7 minutes 30 seconds that is the time corresponding to the highest percentage in the graph described with reference to FIG. 22C, as illustrated in FIG. 26.

Referring back to FIG. 14, the information generation unit 114 compares the first reference time specified in S36 with the third reference time detected to be inputted in S41 (S43).

As a result, when it is determined that the first reference time is larger than the third reference time (YES in S43), the information generation unit 114 calculates, from the post-conversion operation interval information 132a generated in S35 and the post-conversion recovery time information 134a generated in S42, a first probability at which the time before the next operation start time for the virtual machine 3 specified in S13 is shorter than the recovery required time of the failure detected to have occurred in S11 (S44).

Figure 27A:
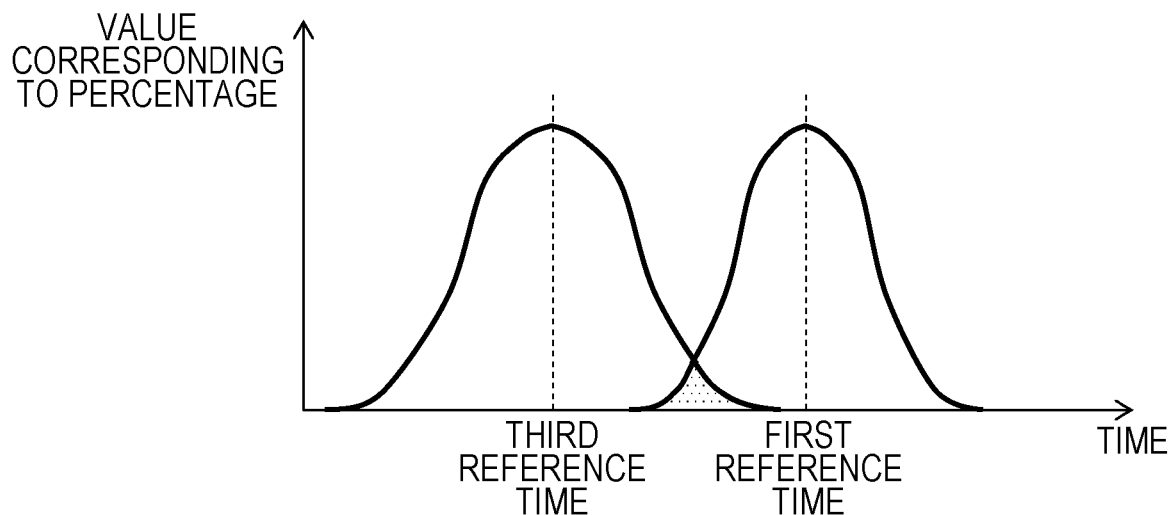
FIGS. 27A and 27B are diagrams explaining examples of a first probability and a second probability.

For example, the information generation unit 114 expresses, on the same plane, the graph representing the post-conversion operation interval information 132a generated in S35 (the graph described with reference to FIG. 24) and the graph representing the post-conversion recovery time information 134a generated in S42 (the graph described with reference to FIG. 26) after converting the graphs such that the both graphs have the same maximum value as illustrated in FIG. 27A, for example. For example, the information generation unit 114 calculates, as the first probability, the percentage of the area of the overlapping portion (shaded area in FIG. 27A) between the graph representing the post-conversion operation interval information 132a and the graph representing the post-conversion recovery time information 134a, in the area surrounded by the graph representing the post-conversion operation interval information 132a and the horizontal axis.

The movement determination unit 115 in the information processor 1 compares the first probability calculated in S44 with a first threshold (for example, a threshold predetermined by the operator) (S45).

For example, the first probability is a probability at which the recovery of the currently occurring failure does not end at the next operation start time for the virtual machine 3 specified in S13. Therefore, when the first reference time is larger than the third reference time and when the first probability is larger than the first threshold, the movement determination unit 115 speculates that the recovery of the currently occurring failure has a high probability of not ending at the next operation start time for the virtual machine 3 specified in S13. Therefore, the movement determination unit 115 determines, in this case, that it is desirable to take measures for the virtual machine 3 specified in S13, such as movement to the different physical machine 2.

The movement determination unit 115 may compare, in S45, the area of the overlapping portion (shaded area in FIG. 27A) between the graph representing the post-conversion operation interval information 132a and the graph representing the post-conversion recovery time information 134a with a predetermined threshold, instead of comparing the first probability with the first threshold.

When the first probability is larger than the first threshold (YES in S45), the information generation unit 114 compares the first reference time specified in S36 with the second reference time specified in S23 (S46).

The information generation unit 114 performs the processing of S46 also when the first reference time is not larger than the third reference time (NO in S43).

When the first reference time is not larger than the third reference time, the movement determination unit 115 speculates that the recovery of the currently occurring failure has a high probability of not ending at the next operation start time for the virtual machine 3 specified in S13. Therefore, the movement determination unit 115 determines, in this case, again, that it is desirable to take measures for the virtual machine 3 specified in S13, such as movement to the different physical machine 2.

Figure 15:
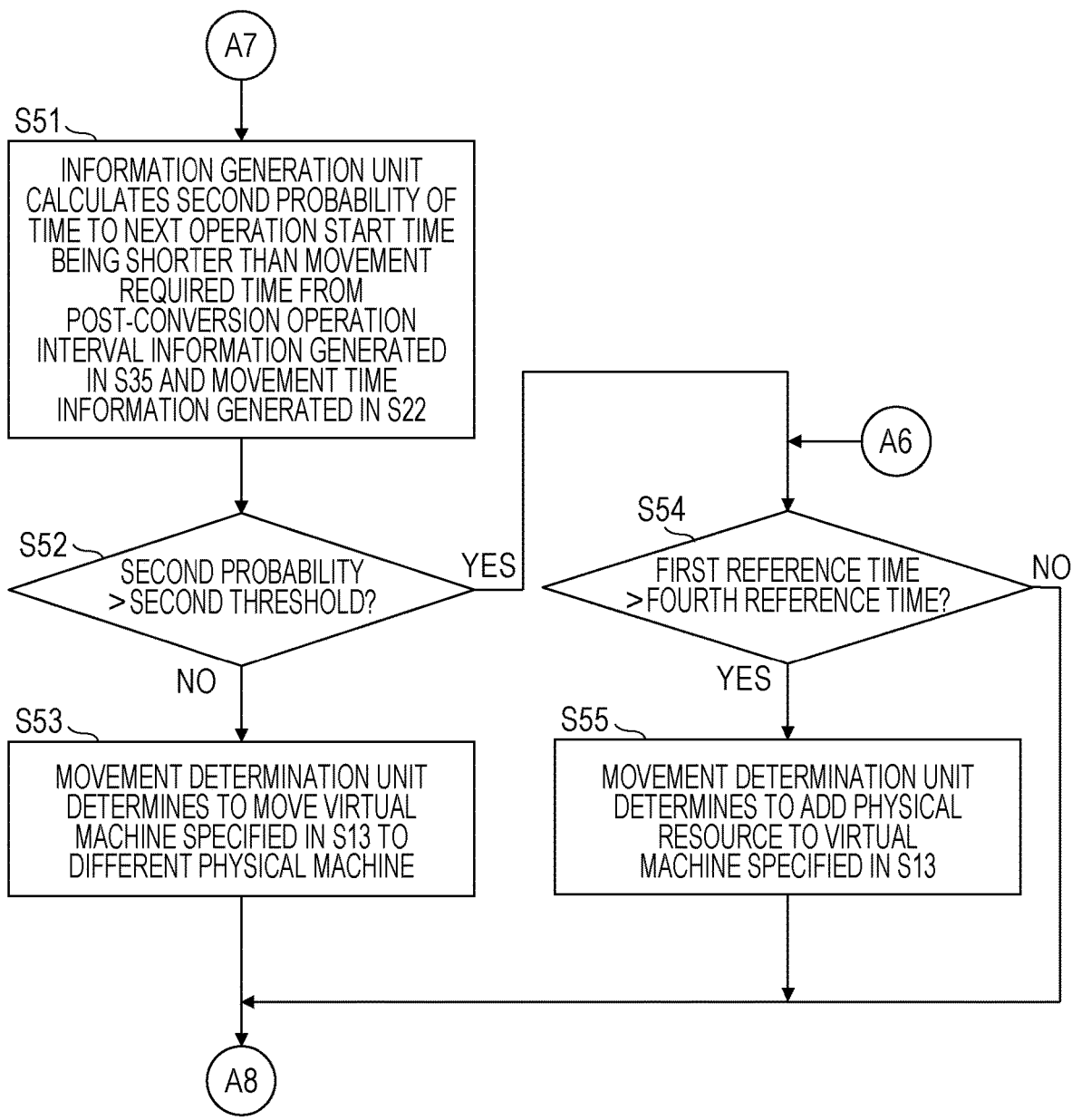
FIG. 15 is a flowchart explaining details of the failure handling processing according to an embodiment.

When it is determined that the first reference time is larger than the second reference time (YES in S46), the information generation unit 114 calculates, from the post-conversion operation interval information 132a generated in S35 and the movement time information 133 generated in S22, a second probability at which the time before the next operation start time for the virtual machine 3 specified in S13 is shorter than the movement required time when movement of the virtual machine 3 specified in S13 is to be started next, as illustrated in FIG. 15 (S51).

Figure 27B:
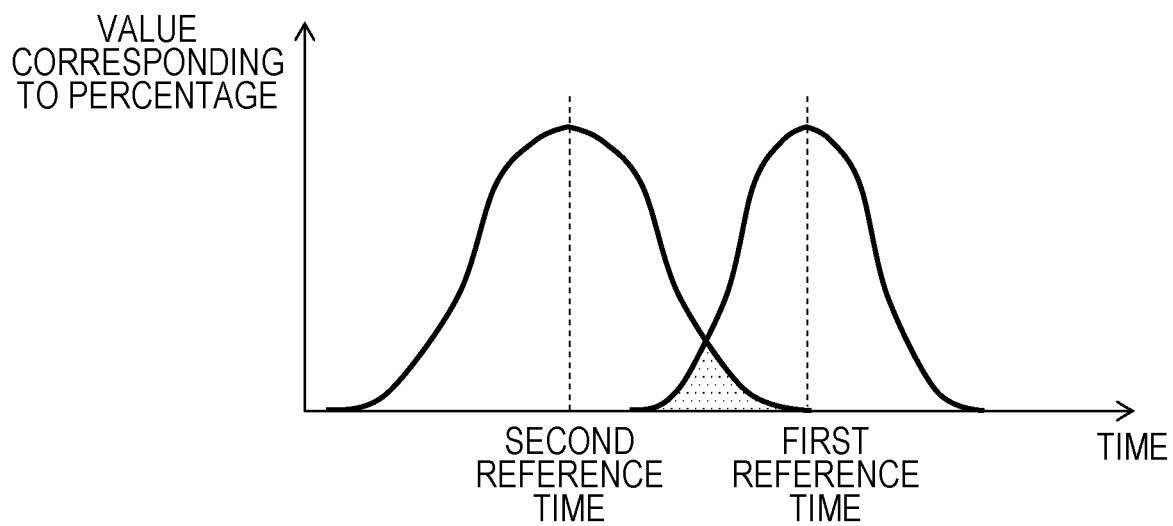

For example, the information generation unit 114 expresses, on the same plane, the graph representing the post-conversion operation interval information 132a generated in S35 (the graph described with reference to FIG. 24) and the graph representing the movement time information 133 generated in S22 (the graph described with reference to FIG. 22B) after converting the graphs such that the both graphs have the same maximum value as illustrated in FIG. 27B. The information generation unit 114 calculates, as the second probability, the percentage of the area of the overlapping portion (shaded area in FIG. 27B) between the graph representing the post-conversion operation interval information 132a and the graph representing the movement time information 133, in the area surrounded by the graph representing the post-conversion operation interval information 132a and the horizontal axis.

The movement determination unit 115 compares the second probability calculated in S51 with a second threshold (for example, a threshold predetermined by the operator) (S52).

The movement determination unit 115 may compare, in S52, the area of the overlapping portion (shaded area in FIG. 27B) between the graph representing the post-conversion operation interval information 132a and the graph representing the movement time information 133 with a predetermined threshold, instead of comparing the second probability with the second threshold.

When the second probability is not larger than the second threshold (NO in S52), the information generation unit 114 determines that the virtual machine 3 specified in S13 is to be moved to the different physical machine 2 (S53).

For example, the second probability is a probability at which the movement of the virtual machine 3 specified in S13 does not end at the next operation start time, when the movement of the virtual machine 3 is to be started next. Therefore, when the second probability is not larger than the second threshold, the movement determination unit 115 speculates that the movement of the virtual machine 3 specified in S13 has a low probability of not ending at the next operation start time, when the movement of the virtual machine 3 is to be started next. Therefore, in this case, the movement determination unit 115 determines to move the virtual machine 3 specified in S13.

On the other hand, when the second probability is larger than the second threshold (YES in S52), the information generation unit 114 compares the first reference time specified in S36 with the fourth reference time specified in S33 (S54). The information generation unit 114 performs the processing of S54 also when the first reference time is not larger than the second reference time (NO in S46).

For example, when the first reference time is larger than the second reference time and when the second probability is larger than the second threshold or when the first reference time is not larger than the second reference time, the movement determination unit 115 speculates that the movement of the virtual machine 3 specified in S13 has a high probability of not ending at the next operation start time. Therefore, in this case, the movement determination unit 115 determines whether to add physical resources to the virtual machine 3 specified in S13, instead of moving the virtual machine 3 specified in S13 to the different physical machine 2.

When the first reference time is larger than the fourth reference time (YES in S54), the movement determination unit 115 determines to add physical resources to the virtual machine 3 specified in S13 (S55).

On the other hand, when the first reference time is not larger than the fourth reference time (NO in S54), the movement determination unit 115 does not perform the processing of S55.

For example, in this case, the movement determination unit 115 determines that not only the movement of the virtual machine 3 specified in S13 but also the addition of the physical resources to the virtual machine 3 specified in S13 may not be performed.

When the first reference time is larger than the fourth reference time (YES in S54), the information generation unit 114 may calculate, from the post-conversion operation interval information 132a generated in S35 and the addition time information 135 generated in S32, a probability (hereinafter also referred to as the third probability) at which the time before the next operation start time for the virtual machine 3 specified in S13 is shorter than the addition required time when addition of physical resources to the virtual machine 3 specified in S13 is to be started next.

When the third probability is not larger than a third threshold (for example, a threshold predetermined by the operator), the movement determination unit 115 may perform the processing of S55, speculating that the addition of physical resources has a low probability of not ending at the next operation start time. When the third probability is larger than the third threshold, the movement determination unit 115 may not perform the processing of S55, speculating that the addition of physical resources of the physical machine 2 has a high probability of not ending at the next operation start time.

Thereafter, as illustrated in FIG. 16, the movement determination unit 115 determines whether or not more than one virtual machine 3 is extracted in S12 (S61).

As a result, when only one virtual machine 3 is extracted in S12 (NO in S61), the information processor 1 terminates the VM movement determination processing.

On the other hand, when more than one virtual machine 3 is extracted in S12 (YES in S61), the movement determination unit 115 determines whether or not the processing of S53 is performed for the virtual machines 3 extracted in S12 (S62).

When it is determined that the processing of S53 is performed (YES in S62), the movement determination unit 115 calculates priority information 137 indicating the priority of the virtual machine 3 specified in S13, from the second probability calculated in S51 and importance information 136 indicating the importance of the virtual machine 3 specified in S13 (S63).

For example, the movement determination unit 115 may calculate the priority information 137 of the virtual machine 3 specified in S13 by multiplying the second probability calculated in S51 by the value indicated by the importance information 136 on the virtual machine 3 specified in S13.

The importance information 136 is information predetermined by the operator, which may be, for example, information determined according to user receiving services by executing the virtual machine 3 specified in S13. Alternatively, the importance information 136 may be determined, for example, according to spending, business type, or the like of the user receiving services. Alternatively, the importance information 136 may be determined according to the number of applications run in the virtual machine 3 specified in S13, or the like.

On the other hand, when it is determined that the processing of S53 is not performed (NO in S62), the movement determination unit 115 does not perform the processing of S63.

The information generation unit 114 determines whether or not every virtual machine 3 extracted in S12 has been specified in S13 (S64).

As a result, when it is determined that not every virtual machine 3 has been specified (NO in S64), the information processor 1 performs again the processing from S13.

On the other hand, when it is determined that every virtual machine 3 has been specified (YES in S64), the movement determination unit 115 groups the virtual machines 3 extracted in S12 by the physical machine 2 in which the respective virtual machines 3 are operated (S65).

The movement determination unit 115 performs processing of determining the order of handling the virtual machines 3 extracted in S12 (hereinafter also referred to as the handling order determination processing) for each group of the virtual machines 3 grouped in S64 (S66).

For example, the information processor 1 may simultaneously perform the handling of the virtual machines 3 grouped into different groups in S64 (virtual machines 3 operated in different physical machines 2). Therefore, the movement determination unit 115 performs the handling order determination processing for each of the virtual machines 3 grouped in S64.

The information processor 1 terminates the VM movement determination processing. Hereinafter, description is given of a example of the importance information 136 and the priority information 137 when it is determined that every virtual machine 3 has been specified in S64.

Example (1) of Importance Information and Priority Information

FIGS. 28 and 29 are diagrams explaining examples of the importance information 136 and the priority information 137.

The information illustrated in FIG. 28 and the like includes items of "item number" for identifying each information, "virtual machine" for storing identification information of each virtual machine 3, "handling" for storing contents of handling determined in S53 or S55, and "second probability" for storing the second probability calculated in S51. In "handling", "movement" determined in S53 or "addition of physical resources" determined in S55 is stored. The information illustrated in FIG. 28 and the like also includes items of "importance" for storing the importance information 136, "priority" for storing the priority information 137, and "physical machine" for storing identification information of the physical machine 2 in which the respective virtual machines 3 are operated. When "addition of physical resources" is stored in "handling", "-" is stored in "second probability" and "priority", indicating that no information is stored.

For example, in the information illustrated in FIG. 28, the information with "item number" of "1" includes "VM1" stored as "virtual machine", "movement" stored as "handling", "0.4" stored as "second probability", "1" stored as "importance", "0.4" stored as "priority", and "A" stored as "physical machine".

Also, in the information illustrated in FIG. 28, the information with "item number" of "3" includes "VM3" stored as "virtual machine", "physical resources added" stored as "handling", "-" stored as "second probability", "3" stored as "importance", "-" stored as "priority", and "A" stored as "physical machine". As for the other information included in FIG. 28, description thereof is omitted.

[Handling Order Determination Processing (1)]

Next, description is given of a example of the handling order determination processing. FIG. 17 is a flowchart explaining a example of the handling order determination processing with reference to FIGS. 1-3 and 5. Hereinafter, description is given of the handling order determination processing for the virtual machines 3 included in a group corresponding to one physical machine 2.

As illustrated in FIG. 17, the movement determination unit 115 specifies a virtual machine 3 having the highest value of the priority information 137 calculated in S63, among the virtual machines 3 extracted in S12 (S71).

For example, the movement determination unit 115 refers to the information described with reference to FIG. 28, for example, to specify "VM2" stored as "virtual machine" in the information with "0.6" stored as "priority".

When the virtual machine 3 determined to be moved to the different physical machine 2 (virtual machine 3 subjected to the processing of S53) is not present in the virtual machines 3 extracted in S12, the movement determination unit 115 may specify the virtual machine 3 having the highest value indicated by the importance information 136 stored in the information storage area 130, among the virtual machines 3 determined to have physical resources added thereto (virtual machines 3 subjected to the processing of S55).

The movement determination unit 115 refers to the priority information 137 calculated in S63 (priority information 137 calculated in the processing of S75 performed last when the priority information 137 is calculated in S75) to perform handling of the virtual machine 3 specified in S71 (S72).

For example, the movement determination unit 115 refers to the priority information 137 calculated in S63 or the like to perform handling in which the information indicating the virtual machine 3 specified in S71 corresponds to the contents set as "handling" in the information set in "virtual machine".

In this case, for example, the movement determination unit 115 may spontaneously move the virtual machine 3 specified in S71 or add physical resources to the virtual machine 3 specified in S71.

Alternatively, the movement determination unit 115 may output, for example, an instruction to move the virtual machine 3 specified in S71 or to add physical resources to the virtual machine 3 specified in S71 to an output screen (not illustrated) of the operation terminal 5. The operator may view the output screen of the operation terminal 5, for example, to move the virtual machine 3 specified in S71 or to add physical resources to the virtual machine 3 specified in S71.

The movement determination unit 115 waits until the handling of the virtual machine 3 specified in S71 is completed (NO in S73).

When the handling of the virtual machine 3 specified in S71 is completed (YES in S73), the movement determination unit 115 determines whether or not handling of all the virtual machines 3 extracted in S12 is completed (S74).

As a result, when it is determined that the handling of all the virtual machines 3 is completed (YES in S74), the information processor 1 terminates the handling order determination processing.

On the other hand, when it is determined that the handling of all the virtual machines 3 is not completed (NO in S74), the movement determination unit 115 calculates again the priority information 137 for each of the virtual machines 3 yet to be handled, among the virtual machines 3 extracted in S12 (S75). The movement determination unit 115 performs again the processing from S71.

For example, when movement of the virtual machine 3 specified in S71 is performed, the number of the virtual machines 3 operated in each physical machine 2 is changed. When the post-conversion operation interval information 132a is generated again, time obtained by subtracting the time required for the handling of the virtual machine 3 specified in S71 from the operation start required time included in the post-conversion operation interval information 132a described with reference to FIG. 23 is stored as the operation start required time included in the post-conversion operation interval information 132a generated again.

Therefore, the movement determination unit 115 calculates again the priority information 137 corresponding to a situation after the handling of the virtual machine 3 specified in S71 is performed, for each of the virtual machines 3 yet to be handled among the virtual machines 3 extracted in S12. For example, the movement determination unit 115 calculates again the priority information 137 by performing again the processing from S13 to S64 by referring to the history information 131 (the first history information 131a, the second history information 131b, the third history information 131c, and the fourth history information 131d) corresponding to the current situation (each virtual machine 3 and the number of the virtual machines 3 operated in the same physical machine 2) for each of the virtual machines 3 yet to be moved among the virtual machines 3 extracted in S12 after the movement of the virtual machine 3 specified in S71 is performed. The movement determination unit 115 specifies a virtual machine 3 to be handled next by referring to the priority information 137 calculated again.

Thus, the information processor 1 may quickly perform handling of each virtual machine 3 while suppressing the influence of a failure that has occurred on services. The movement determination unit 115 may accurately suppress occurrence of failure in the virtual machine 3 that does not operate until next operation start time.

When the priority information 137 is calculated again, it may be determined, for example, that there have been no changes in the operation interval information 132 described with reference to FIG. 21A and the recovery time information 134 described with reference to FIG. 21C since the previous calculation of the priority information 137. Therefore, when calculating again the priority information 137, the information processor 1 may use the results obtained when the processing of S16 and S26 is previously performed, without performing the processing of S14 to S16 and S24 to S26.

For example, when no virtual machine 3 is moved in the processing of S72 previously performed, it may be determined that there has been no change in the movement time information 133 described with reference to FIG. 21B since the previous calculation of the priority information 137. Therefore, the information processor 1 may use the result obtained when the processing of S23 is previously performed, without performing the processing of S21 to S23.

For example, when no physical resources are added in the processing of S72 previously performed, it may be determined that there has been no change in the addition time information 135 described with reference to FIG. 21D since the previous calculation of the priority information 137. Therefore, in this case, the information processor 1 may use the result obtained when the processing of S33 is previously performed, without performing the processing of S31 to S33. Hereinafter, description is given of a example of the importance information 136 and the priority information 137 after the priority information 137 is calculated again.

Example (2) of Importance Information and Priority Information

FIG. 29 is a diagram explaining a example of the importance information 136 and the priority information 137 after the priority information 137 is calculated again.

For example, in the information illustrated in FIG. 29, the information with "item number" of "1" includes "VM1" stored as "virtual machine", "movement" stored as "handling", "0.4" stored as "second probability", "1" stored as "importance", "0.4" stored as "priority", and "A" stored as "physical machine", as in the case of FIG. 28.

Meanwhile, in the information illustrated in FIG. 29, the information with "item number" of "3" includes "VM3" stored as "virtual machine", "movement" stored as "handling", "0.4" stored as "second probability", "3" stored as "importance", "1.2" stored as "priority", and "A" stored as "physical machine", unlike the case of FIG. 28.

For example, the example illustrated in FIG. 29 represents the case where the contents of handling of the virtual machine 3 with the identification information of "VM3" are changed from the addition of physical resources to the movement of the virtual machine 3, as a result of the movement of the virtual machine 3 with the identification information of "VM2" (the virtual machine 3 specified in S71).

In the processing of S71 and S72, the movement determination unit 115 may perform the handling sequentially from the virtual machine 3 with high priority information 137 calculated in S63. For example, the movement determination unit 115 may determine the order of the virtual machines 3 to be handled based on the contents of the priority information 137 first calculated, without repeating the calculation of the priority information 137 (processing of S75).

[Handling Order Determination Processing (2)]

Next, description is given of another example of the handling order determination processing. FIGS. 18 and 19 are flowcharts explaining another example of the handling order determination processing with reference to FIGS. 1-3 and 5. Hereinafter, description is given of the handling order determination processing for the virtual machines 3 included in a group corresponding to one physical machine 2.

In another example of the handling order determination processing, the movement determination unit 115 previously estimates handling that may be performed for each virtual machine 3 when following the handling order for the virtual machine 3, unlike the handling order determination processing described with reference to FIG. 17. The movement determination unit 115 specifies an optimum solution (for example, the handling order that enables movement of the largest number of virtual machines 3) from the estimated handling order, and performs handling of each virtual machine 3 according to the specified handling order. This another example of the handling order determination processing is described in detail below.

As illustrated in FIG. 18, the movement determination unit 115 specifies one virtual machine 3 from among those in the handling order, which are extracted in S12 (S81).

For example, the movement determination unit 115 specifies the handling order, for example, in which the virtual machine 3 with the identification information of "VM1" comes first, the virtual machine 3 with the identification information of "VM2" comes second, and the virtual machine 3 with the identification information of "VM3" comes third.

The movement determination unit 115 specifies the virtual machine 3 assumed to be handled in S53 or S55, of which actual handling is yet to be determined in S84, among the virtual machines 3 included in the handling order specified in S81 (S82).

For example, when there is no virtual machine 3 assumed to be handled in S53 or S55, of which actual handling is determined in S84, the movement determination unit 115 specifies all of the virtual machine 3 with the identification information of "VM1", the virtual machine 3 with the identification information of "VM2", and the virtual machine 3 with the identification information of "VM3".

The movement determination unit 115 specifies the virtual machine 3 to be determined to be handled next, from among the virtual machines 3 specified in S82 (S83).

For example, when the virtual machine 3 with the identification information of "VM1", the virtual machine 3 with the identification information of "VM2", and the virtual machine 3 with the identification information of "VM3" are specified in S82, the movement determination unit 115 specifies the virtual machine 3 with the identification information of "VM1" (the virtual machine 3 that comes first in the handling order).

The movement determination unit 115 refers to the priority information 137 calculated in S63 (when the priority information 137 is calculated in S75, the priority information 137 calculated in the processing last performed in S75) to determine handling of the virtual machine 3 specified in S83 (S84).

For example, in the information described with reference to FIG. 28, the information with "virtual machine" of "VM1" (information with "item number" of "1") includes "movement" stored as "handling". Therefore, in this case, as the handling of the virtual machine 3 with the identification information of "VM1", the movement determination unit 115 determines to move the virtual machine 3 to the different physical machine 2.

The movement determination unit 115 calculates again the priority information 137 for the virtual machine 3 assumed to be handled in S53 or S55, of which actual handling is yet to be determined in S84, among the virtual machines 3 included in the handling order specified in S81 (S85).

For example, in this case, the movement determination unit 115 calculates again the priority information 137 by calculating again the processing from S13 to S64, as in the case of the processing described in S75.

For example, when handling of the virtual machine 3 with the identification information of "VM1" is determined in S84, for example, the priority information 137 after moving the virtual machine 3 with the identification information of "VM1" is moved to the different physical machine 2 is calculated for the virtual machine 3 with the identification information of "VM2" and the virtual machine 3 with the identification information of "VM3", respectively.

The movement determination unit 115 determines whether or not actual handling is determined for all the virtual machines 3 included in the handling order specified in S81 (S86).

As a result, when it is determined that actual handling is not determined for all the virtual machines 3 included in the handling order specified in S81 (NO in S86), the movement determination unit 115 performs again the processing from S82.

On the other hand, when it is determined that actual handling is determined for all the virtual machines 3 included in the handling order specified in S81 (YES in S86), the movement determination unit 115 determines whether or not the handling order is specified in S81 for every handling order of the virtual machines 3 extracted in S12, as illustrated in FIG. 19 (S91).

When it is determined that the handling order is not specified for every handling order of the virtual machines 3 extracted in S12 (NO in S91), the movement determination unit 115 performs again the processing from S81.

On the other hand, when it is determined that the handling order is specified for every handling order of the virtual machines 3 extracted in S12 (YES in S91), the movement determination unit 115 calculates the number of the virtual machines 3 that may be moved to the different physical machine 2, for each order of the virtual machines 3 extracted in S12, for example (S92).

The movement determination unit 115 performs handling of the virtual machine 3 extracted in S12 according to the handling order with the largest number calculated in S92, for example (S93).

For example, the movement determination unit 115 performs, for each virtual machine 3, the handling determined in S84 for the handling order with the largest number calculated in S92.

For example, for each possible handling order for each virtual machine 3, the movement determination unit 115 estimates the contents of the handling that may be performed for each virtual machine 3 without actually performing the handling of each virtual machine 3. The movement determination unit 115 specifies the handling order that may satisfy a predetermined condition (for example, the handling order with the largest number of the virtual machines 3 that may be moved to the different physical machine 2) among the possible handling orders for each virtual machine 3. The movement determination unit 115 performs the handling of each virtual machine 3 according to the specified handling order.

Thus, the information processor 1 may perform flexible handling of each virtual machine 3 according to the occurrence of failure and the like. The movement determination unit 115 may accurately suppress the occurrence of failure in the virtual machine 3 not operated until the next operation start time, as in the case of the handling order determination processing described with reference to FIG. 17.

For example, the movement determination unit 115 may calculate the number of virtual machines 3 for which both of the movement to the different physical machine 2 and the addition of physical resources of the physical machine 2 may not be performed. The movement determination unit 115 may perform the handling determined in S53 or S55, for each of the virtual machines 3 extracted in S12, according to the handling order with the smallest number of virtual machines 3 for which both of the movement to the different physical machine 2 and the addition of physical resources of the physical machine 2 may not be performed.

Alternatively, the movement determination unit 115 may perform the handling determined in S53 or S55, for each of the virtual machines 3 extracted in S12, according to the handling order with the smallest first probability for the virtual machine 3 having the highest value indicated by the importance information 136, among the virtual machines 3 extracted in S12.

Thus, the information processor 1 according to this embodiment extracts the virtual machine 3 before starting its operation from among the virtual machines 3 within the range of influence of a failure detected to have occurred upon detection of the occurrence of the failure. The information processor 1 refers to the information storage area 130 storing the history information 131 to generate the operation interval information 132 for the extracted virtual machine 3, the movement time information 133 for the extracted virtual machine 3, and the recovery time information 134 for the failure detected to have occurred.

The information processor 1 determines whether to move the extracted virtual machine 3 to the different physical machine 2, based on the generated operation interval information 132, movement time information 133, and recovery time information 134.

For example, the information processor 1 refers to the history information 131 that is the information about failures that have occurred in the past or the information about operating conditions of the virtual machine 3, and predicts the time when the extracted virtual machine 3 starts its next operation, the time required when the extracted virtual machine 3 is to be moved next, and the time required for recovery of the failure detected to have occurred. The information processor 1 specifies the virtual machine 3 that may be moved to the different physical machine 2 before the next operation is started, based on the predicted various information. The information processor 1 further determines the specified virtual machine 3 as the virtual machine 3 to be moved to the different physical machine 2.

Accordingly, the information processor 1 may properly determine the virtual machine 3 required to be moved to the different physical machine 2 in the event of failure. Thus, the operator may further suppress the influence of the failure that has occurred.

When performing the handling for each of the virtual machines 3 extracted in S12, the information processor 1 may, for example, perform handling of the virtual machine 3 determined to be moved to the different physical machine 2 before handling of the virtual machine 3 determined to have physical resources added thereto.

In the case of performing the VM movement determination processing, when there is no history information 131 corresponding to the virtual machine 3 extracted in S12 and the physical machine 2 in which the virtual machine 3 extracted in S12 is operated, the information processor 1 may perform subsequent processing by referring to the existing information (for example, the history information 131 with similar conditions). For example, when there is the history information 131 corresponding to the virtual machine 3 extracted in S12 but there is no history information 131 corresponding to the virtual machine 3 extracted in S12 and the physical machine 2 in which the virtual machine 3 extracted in S12 is operated, the information processor 1 may perform subsequent processing by referring to the history information 131 corresponding to the virtual machine 3 extracted in S12.

When there is no history information 131 corresponding to the virtual machine 3 extracted in S12 and the physical machine 2 in which the virtual machine 3 extracted in S12 is operated, the information processor 1 may notify the operator to that effect. The information processor 1 may perform subsequent processing, for example, by referring to the history information 131 selected by the operator among the generated history information 131.

When the history information 131 is generated according to the number of the virtual machines 3 operated in the physical machine 2, for example, if there is no history information 131 corresponding to the number of the virtual machines 3 operated in the same physical machine 2 as that of the virtual machine 3 extracted in S12, the information processor 1 may calculate the percentage of the number of the virtual machines 3 operated in the same physical machine 2 as that of the virtual machine 3 extracted in S12 (hereinafter also referred to as the number percentage) among all the virtual machines 3 operated in the information processing system 10. The information processor 1 may perform subsequent processing by referring to the history information 131 corresponding to the number percentage close to the calculated number percentage, among the generated history information 131.

Thus, the information processor 1 may properly perform the VM movement determination processing even when no history information 131 is generated that meets the conditions.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:
    extracting a virtual machine before starting operation from among virtual machines within a range of influence of a failure upon detection of the failure;
    with reference to a memory for storing history information concerning operation of the virtual machine, generating first information corresponding to time intervals of operation start time of the extracted virtual machine, second information corresponding to movement required time required to move the extracted virtual machine out of the range of influence of the failure, and third information corresponding to recovery required time required for recovery of the failure detected to have occurred; and
    determining whether to move the extracted virtual machine out of the range of influence of the failure, based on the generated first, second, and third information.

2. The non-transitory, computer-readable recording medium of claim 1, wherein the generating includes:
    referring to the memory for storing the history information to specify one or more time intervals in the past for the extracted virtual machine,
    generating, as the first information, information indicating a percentage for each of the specified time intervals to whole the specified time intervals,
    referring to the memory for storing the history information to specify movement required times in the past for the extracted virtual machine,
    generating, as the second information, information indicating the percentage for each of the specified movement required times to whole the specified movement required times,
    referring to the memory for storing the history information to calculate a time difference between the recovery required time upon a past occurrence of the failure and a predicted time for the recovery required time predicted upon the past occurrence of the failure, for each of failures occurred in the past, and
    generating, as the third information, information indicating a percentage for each of the calculated time differences to whole the calculated time differences.

3. The non-transitory, computer-readable recording medium of claim 2, wherein the determining includes:
    calculating an elapsed time from a previous operation start time to a current time for the extracted virtual machine,
    calculating, from the first and third information, a first probability at which a time obtained by subtracting the calculated elapsed time from a selected one of the time intervals is shorter than a time obtained by adding the calculated time difference to the predicted time for the recovery required time predicted for the failure detected to have occurred,
    calculating, from the first and second information, when the calculated first probability is not less than a first threshold, a second probability at which the time obtained by subtracting the calculated elapsed time from the selected one of the time intervals is shorter than the movement required time, and moving, when the calculated second probability is not more than a second threshold, the extracted virtual machine out of the range of influence of the failure.

4. The non-transitory, computer-readable recording medium of claim 2, wherein the generating includes generating the first information, the second information, and the third information for each of the virtual machines when there is more than one virtual machine extracted; and the determining includes:

calculating, when there is more than one virtual machine determined to be moved out of the range of influence of the failure, priority information for each of the virtual machines from the first probability, and determining to move the virtual machines out of the range of influence of the failure sequentially from a virtual machine having a larger value of the priority information calculated.

5. The non-transitory, computer-readable recording medium of claim 4, the process further comprising when a plurality of virtual machines before operation have been extracted, performing again the determining of whether to move the extracted virtual machines out of the range of influence of the failure, upon completion of the movement of each of the plurality of virtual machines out of the range of influence of the failure.

6. The non-transitory, computer-readable recording medium of claim 4, the process further comprising:

when a plurality of virtual machines before operation have been extracted, calculating the number of the virtual machines that may be moved out of the range of influence of the failure when moving more than one virtual machine in a predetermined order by repeating the determining of whether to move the extracted virtual machines out of the range of influence of the failure, while assuming that the plurality of virtual machines are moved one by one in the predetermined order; and determining to move more than one virtual machine in the predetermined order when the calculated number is not less than a threshold.

7. The non-transitory, computer-readable recording medium of claim 1, wherein:

the generating includes referring to the memory for storing the history information to generate fourth information indicating addition required time required to add resources of a physical machine in which the extracted virtual machine is operated; and the determining includes determining, based on the generated first and fourth information, whether to add the resources of the physical machine in which the extracted virtual machine is operated, when determining that the extracted virtual machine is not to be moved out of the range of influence of the failure.

8. The non-transitory, computer-readable recording medium of claim 1, wherein the generating the first information, the second information, and the third information includes:

specifying a physical machine in which the extracted virtual machine is operated, specifying the number of virtual machines operated in the specified physical machine, and referring to the memory for storing history information to specify history information corresponding to the specified number, among the history information, to generate the first information, the second information, and the third information.

9. A failure handling method performed by a processor included in a failure handling apparatus, the failure handling method comprising:

extracting a virtual machine before starting operation from among virtual machines within a range of influence of a failure upon detection of the failure;

referring to a memory for storing history information concerning operation of a virtual machine to generate first information corresponding to time intervals of operation start time of the extracted virtual machine, second information corresponding to movement required time required to move the extracted virtual machine out of the range of influence of the failure, and third information corresponding to recovery required time required for recovery of the failure detected to have occurred; and determining whether to move the extracted virtual machine out of the range of influence of the failure, based on the generated first, second, and third information.

10. The failure handling method of claim 9, wherein the generating includes:

referring to the memory for storing the history information to specify a time interval in the past for the extracted virtual machine;

generating, as the first information, information indicating a percentage for each of the specified time intervals to whole the specified time intervals;

referring to the memory for storing the history information to specify movement required times in the past for the extracted virtual machine;

generating, as the second information, information indicating the percentage for each of the specified movement required times to whole the specified movement required times;

referring to the memory for storing the history information to calculate a time difference between the recovery required time upon a past occurrence of the failure and a predicted time for the recovery required time predicted upon the past occurrence of the failure, for each of failures occurred in the past; and generating, as the third information, information indicating a percentage for each of the calculated time differences to whole the calculated time differences.

11. The failure handling method of claim 9, wherein the determining includes:

calculating an elapsed time from a previous operation start time to a current time for the extracted virtual machine, calculating, from the first and third information, a first probability at which a time obtained by subtracting the calculated elapsed time from a selected one of the time intervals is shorter than a time obtained by adding the calculated time difference to the predicted time for the recovery required time predicted for the failure detected to have occurred, calculating, from the first and second information, when the calculated first probability is not less than a first threshold, a second probability at which the time obtained by subtracting the calculated elapsed time from the selected one of the time intervals is shorter than the movement required time, and moving, when the calculated second probability is not more than a second threshold, the extracted virtual machine out of the range of influence of the failure.

12. A failure handling method comprising:
determining a plurality of physical machines that are connected to a network;
determining a plurality of virtual machines running on the plurality of physical machines;
determining an operation status of the plurality of virtual machines, the operation status comprising an in-operation status or a not-in-operation status;
determining whether a failure has occurred in a virtual machine;
determining a range of influence of the failure;
determining a not-in-operation virtual machine having a not-in-operation status and a location within the range of influence;
determining whether to move the not-in-operation virtual machine; and
moving the not-in-operation virtual machine to a location outside the range of influence when a determination is made to move the not-in-operation virtual machine,
the determining the plurality of virtual machines comprises accessing history information stored in a storage area of an information processor, and
the history information comprises any of operation start time, movement time, and recovery time.

13. The method of claim 12 further comprising extracting the not-in-operation virtual machine.

14. The method of claim 13 further comprising generating any of information corresponding to time intervals of the operation start time of an extracted virtual machine, the movement time, and the recovery time.

15. The method of claim 14, wherein the determining whether to move the not-in-operation virtual machine is based on any of the information generated.

* * * * *